United States Patent
Kawabe et al.

(10) Patent No.: US 7,912,846 B2
(45) Date of Patent: Mar. 22, 2011

(54) DOCUMENT PROCESSING METHOD, RECORDING MEDIUM, AND DOCUMENT PROCESSING SYSTEM

(75) Inventors: Shigehisa Kawabe, Yokohama (JP); Setsu Kunitake, Yokohama (JP); Akira Suzuki, Yokohama (JP); Katsuhide Tanaka, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 291 days.

(21) Appl. No.: 11/524,830

(22) Filed: Sep. 21, 2006

(65) Prior Publication Data
US 2007/0130176 A1 Jun. 7, 2007

(30) Foreign Application Priority Data
Dec. 7, 2005 (JP) ................................. 2005-353456

(51) Int. Cl.
*G06F 7/00* (2006.01)
*G06F 17/30* (2006.01)
(52) U.S. Cl. ......... 707/758; 707/778; 707/779; 715/235
(58) Field of Classification Search ........................ None
See application file for complete search history.

(56) References Cited

U.S. PATENT DOCUMENTS

| | | | |
|---|---|---|---|
| 6,847,979 B2 * | 1/2005 | Allemang et al. | 707/102 |
| 7,039,860 B1 * | 5/2006 | Gautestad | 715/205 |
| 7,379,945 B1 * | 5/2008 | Hirsch et al. | 707/102 |
| 2001/0018697 A1 * | 8/2001 | Kunitake et al. | 707/517 |
| 2002/0065842 A1 * | 5/2002 | Takagi et al. | 707/500 |
| 2002/0149618 A1 * | 10/2002 | Estrada et al. | 345/760 |
| 2002/0156808 A1 * | 10/2002 | Duffy et al. | 707/505 |
| 2002/0156879 A1 * | 10/2002 | Delany et al. | 709/223 |
| 2003/0101223 A1 * | 5/2003 | Pace et al. | 709/206 |
| 2003/0126136 A1 * | 7/2003 | Omoigui | 707/10 |
| 2004/0162853 A1 * | 8/2004 | Brodersen et al. | 707/104.1 |
| 2005/0028088 A1 | 2/2005 | Nagayama | |
| 2005/0132278 A1 * | 6/2005 | Yoshida | 715/513 |
| 2005/0138160 A1 * | 6/2005 | Klein et al. | 709/223 |
| 2005/0171947 A1 * | 8/2005 | Gautestad | 707/5 |

FOREIGN PATENT DOCUMENTS

| | | |
|---|---|---|
| JP | 2004-86855 | 3/2004 |
| JP | 2005-50078 | 2/2005 |

* cited by examiner

*Primary Examiner* — Mohammad Ali
*Assistant Examiner* — Angelica Ruiz
(74) *Attorney, Agent, or Firm* — Gauthier & Connors LLP

(57) ABSTRACT

There is provided a document processing method in which a document is created by applying one or more templates to multiple structured documents stored in a folder among a group of folders having a hierarchical structure in a document database, the method including acquiring a first structured document including multiple document elements forming a structure, acquiring information of a hierarchical structure of the folders in the document database, creating integrated structure information by merging the structure of the document elements of the first structured document into a position of a folder, in the hierarchical structure formed by the folders, in which the first structured document is stored, and applying a template to the integrated structure information.

12 Claims, 20 Drawing Sheets

| CONT-EXT NUMBER | CONTEXT IDENTIFIER | ELEMENT NAME | text | NAME | title | ID | url_1 | JUMPID |
|---|---|---|---|---|---|---|---|---|
| 0 | / | FOLDER | | FOLDER 1 | | | | |
| 1 | /1 | FOLDER | | FOLDER 2 | | | | |
| 2 | /1/1 | DOCUMENT | | DOCUMENT 1 | | | | |
| 3 | /1/1/1 | PART | IN PRIOR ART, ... | | PROBLEM OF PRIOR ART | A010100 | A010100.html | |
| 4 | /1/1/2 | PART | IN PROPOSED TECHNIQUE, ... | | PROPOSAL OF NEW TECHNIQUE | A010200 | A010200.html | |
| 5 | /1/1/3 | PART | OLD AND NEW TECHNIQUES ... | | COMPARISON | A010300 | A010300.html | |
| 6 | /1/2 | DOCUMENT | | DOCUMENT 2 | | | | |
| 7 | /2 | FOLDER | | FOLDER 3 | | | | |
| 8 | /2/1 | DOCUMENT | | DOCUMENT 3 | | | | |
| 9 | /2/1/1 | PART | | | PROBLEM OF PRIOR ART | A030100 | A030100.html | |

Fig. 3

| CONTEXT NUMBER | CONTEXT IDENTIFIER | ELEMENT NAME | text | NAME | title | ID | url_1 | JUMPID |
|---|---|---|---|---|---|---|---|---|
| 10 | /2/1/1/1 | CHAPTER | CONVENTIO- NALLY, STRUCTURED DOCUMENT PROCESS ... | | PRIOR ART | A030101 | A030101.html | |
| 11 | /2/1/1/1/1 | JUMP | REFERENCE DOCUMENT 1 | | | | | A010200 |
| 12 | /2/1/1/2 | CHAPTER | | | PROBLEM | A030102 | A030102.html | |
| 13 | /2/1/1/2/1 | SECTION | REGARDING COST OF PRIOR ART, ... | | COST | A030102_1 | A030102_1.html | |
| 14 | /2/1/1/2/2 | SECTION | FROM VIEWPOINT OF USABILITY, ... | | USABILITY | A030102_2 | A030102_2.html | |
| 15 | /2/1/2 | PART | IN CONSIDER- ATION OF SUCH PROBLEM, ... | | PROPOSAL OF NEW TECHNIQUE | A030200 | A030200.html | |

Fig. 4

| NODE ID | NODE LABEL | NODE TYPE | NODE VALUE |
|---|---|---|---|
| E0 | TEMPLATE 1 | TEMPLATE | |
| E1 | TEXT ELEMENT 1 | TEXT ELEMENT | TABLE OF CONTENTS <LINE FEED> |
| E2 | REPETITION ELEMENT 1 | REPETITION ELEMENT | |
| E3 | VARIABLE ELEMENT 1 | VARIABLE ELEMENT | $SECTION.title$ |
| E4 | SELECTION ELEMENT 1 | SELECTION ELEMENT | |
| E5 | TEXT ELEMENT 2 | TEXT ELEMENT | ( |
| E6 | VARIABLE ELEMENT 2 | VARIABLE ELEMENT | $SECTION.whatsNew$ |
| E7 | TEXT ELEMENT 3 | TEXT ELEMENT | ) |
| E8 | TEXT ELEMENT 4 | TEXT ELEMENT | : <LINE FEED> |
| E9 | TEXT ELEMENT 5 | TEXT ELEMENT | <LINE FEED> |

Fig. 6

| CONT-EXT NUMBER | CONTEXT IDENTIFIER | ELEMENT NAME | title | ID | whatsNew | text | url_1 |
|---|---|---|---|---|---|---|---|
| 0 | / | FOLDER | CLASSIF-ICATION | F0100000000 | | | F0100000000.html |
| 1 | /1 | FOLDER | WORK 1 | F0200000000 | | | F0200000000.html |
| 2 | /1/1 | DOCUMENT | MANUAL | A0100000000 | | | A0100000000.html |
| 3 | /1/1/1 | PART | BASICS | A0101000000 | | | A0101000000.html |
| 4 | /1/1/1/1 | CHAPTER | OPERATI-ON | A0101010000 | | | A0101010000.html |
| 5 | /1/1/1/1/1 | DOCITEM | | A0101010001 | | IN THIS CHAPTER, OPERATION WILL BE EXPLAINED. | A0101010001.html |
| 6 | /1/1/1/1/2 | SECTION | FUNCTION 1 | A0101010100 | NEWLY ARRIVED | | A0101010100.html |
| 7 | /1/1/1/1/2/1 | DOCITEM | | A0101010101 | | IN THIS SECTION, FUNCTION 1 WILL BE EXPLAINED. | A0101010101.html |
| 8 | /1/1/1/1/3 | SECTION | FUNCTION 2 | A0101010200 | | | A0101010200.html |
| 9 | /1/1/1/1/3/1 | DOCITEM | | A0101010201 | | IN THIS SECTION, FUNCTION 2 WILL BE EXPLAINED. | A0101010201.html |
| 10 | /1/1/1/1/4 | SECTION | FUNCTION 3 | A0101010300 | | | A0101010300.html |
| 11 | /1/1/1/1/4/1 | DOCITEM | | A0101010301 | | IN THIS SECTION, FUNCTION 3 WILL BE EXPLAINED. | A0101010301.html |
| 12 | /1/1/1/1/4/2 | DOCITEM | | A0101010302 | | ※THIS FUNCTION WILL BE SUPPORTED IN Rev 2.0. | A0101010302.html |
| 13 | /1/1/1/2 | CHAPTER | MAINTEN-ANCE | A0101020100 | | | A0101020100.html |
| 14 | /1/1/2 | PART | APPLICA-TION | A0102010000 | | | A0102010000.html |
| 15 | /2 | FOLDER | WORK 2 | F0300000000 | | | F0300000000.html |

Fig. 8

| NODE NUMB-ER | NODE TYPE | VARI-ABLE NAME | CONTE-XT IDE-NTIFIER | ELEMENT NAME OF CONTEXT | MATCHING DETERMINAT-ION VALUE | REPET-ITION TARGET | V | v |
|---|---|---|---|---|---|---|---|---|
| 0 | TEMPLATE | | /1/1 | CHAPTER | ASSIGNABLE | | | |
| 1 | TEXT ELEMENT | | /1/1 | CHAPTER | DETERMINED | | | TABLE OF CONTENTS <LINE FEED> |
| 2 | REPETITION ELEMENT | | /1/1 | CHAPTER | ASSIGNABLE | /1/1/2 /1/1/3 /1/1/4 | | |
| 3 | VARIABLE ELEMENT | SECT-ION | /1/1/1 | DOCITEM | NON-ASSIGNABLE | | | <NOT OUTPUT> |
| 4 | SELECTION RANGE | | /1/1/1 | DOCITEM | NON-ASSIGNABLE | | | |
| 8 | TEXT ELEMENT | | /1/1/1 | DOCITEM | - | | | <NOT OUTPUT> |
| 3 | VARIABLE ELEMENT | SECT-ION | /1/1/2 | SECTION | ASSIGNABLE | /1/1/2 | | FUNCTION 1 |
| 4 | SELECTION ELEMENT | | /1/1/2 | SECTION | ASSIGNABLE | | | |
| 5 | TEXT ELEMENT | | /1/1/2 | SECTION | DETERMINED | | | ( |
| 6 | VARIABLE ELEMENT | SECT-ION | /1/1/2 | SECTION | ASSIGNABLE | /1/1/2 | | NEWLY ARRIVED |
| 7 | TEXT ELEMENT | | /1/1/2 | SECTION | DETERMINED | | | ) |
| 8 | TEXT ELEMENT | | /1/1/2 | SECTION | DETERMINED | | | :<LINE FEED> |
| 3 | VARIABLE ELEMENT | SECT-ION | /1/1/3 | SECTION | ASSIGNABLE | /1/1/3 | | FUNCTION 2 |
| 4 | SELECTION ELEMENT | | /1/1/3 | SECTION | NON-ASSIGNABLE | | | |
| 8 | TEXT ELEMENT | | /1/1/3 | SECTION | DETERMINED | | | :<LINE FEED> |
| 3 | VARIABLE ELEMENT | SECT-ION | /1/1/4 | SECTION | ASSIGNABLE | /1/1/4 | | FUNCTION 3 |
| 4 | SELECTION ELEMENT | | /1/1/4 | SECTION | NON-ASSIGNABLE | | | |
| 8 | TEXT ELEMENT | | /1/1/4 | SECTION | DETERMINED | | | :<LINE FEED> |
| 9 | TEXT ELEMENT | | /1/1 | CHAPTER | DETERMINED | | | <LINE FEED> |

Fig. 9

| ELEMENT NAME | TEMPLATE NAME |
|---|---|
| CHAPTER | chapter.html |
| SECTION | section.html |

| ELEMENT NAME | TEMPLATE NAME |
|---|---|
| PART | frameSet.html |
| PART | partLeft.html |
| PART | partRight.html |
| CHAPTER | chapterLeft.html |
| CHAPTER | chapterRight.html |

Fig. 14

| ELEMENT NAME | TEMPLATE NAME |
|---|---|
| CHAPTER | chapterFrameSet.html |
| CHAPTER | chapterLeft.html |
| CHAPTER | chapterRight.html |
| SECTION | section.html |

Fig. 15

| CONT-EXT NUMBER | CONTEXT IDENTIFIER | ELEMENT NAME | title | ID | text | url_1 | url_2 | url_3 |
|---|---|---|---|---|---|---|---|---|
| 0 | / | FOLDER | CLASSIFIC-ATION | F0100000000 | | | | |
| 1 | /1 | FOLDER | WORK 1 | F0200000000 | | | | |
| 2 | /1/1 | DOCUMENT | MANUAL | A0100000000 | | | | |
| 3 | /1/1/1 | PART | BASICS | A0101000000 | | | | |
| 4 | /1/1/1/1 | CHAPTER | OPERATION | A0101010000 | | A0101010000_chapterFrameSet.html | A0101010000_chapterLeft.html | A0101010000_chapterRight.html |
| 5 | /1/1/1/1/1 | DOCITEM | | A0101010001 | IN THIS CHAPTER, OPERATION WILL BE EXPLAINED. | | | |
| 6 | /1/1/1/1/2 | SECTION | FUNCTION 1 | A0101010100 | | A0101010100_section.html | | |
| 7 | /1/1/1/1/2/1 | DOCITEM | | A0101010101 | IN THIS SECTION, FUNCTION 1 WILL BE EXPLAINED. | | | |
| 8 | /1/1/1/1/3 | SECTION | FUNCTION 2 | A0101010200 | | A0101010200_section.html | | |
| 9 | /1/1/1/1/3/1 | DOCITEM | | A0101010201 | IN THIS SECTION, FUNCTION 2 WILL BE EXPLAINED. | | | |

Fig. 16

| CONT-EXT NUMBER | CONTEXT IDENTIFIER | ELEMENT NAME | title | ID | text | url_1 | url_2 | url_3 |
|---|---|---|---|---|---|---|---|---|
| 10 | /1/1/1/1/4 | SECTION | FUNCTION 3 | A0101010300 | | A0101010300_section.html | | |
| 11 | /1/1/1/1/4/1 | DOCITEM | | A0101010301 | IN THIS SECTION, FUNCTION 3 WILL BE EXPLAINED. | | | |
| 12 | /1/1/1/1/4/2 | DOCITEM | | A0101010302 | ※THIS FUNCTION WILL BE SUPPORTED IN Rev 2.0. | | | |
| 13 | /1/1/1/2 | CHAPTER | MAINTENANCE | A0101020100 | | A0101020000_chapterFrameSet.html | A0101020000_chapterLeft.html | A0101020000_chapterRight.html |
| 14 | /1/1/2 | PART | APPLICATION | A0102010000 | | | | |
| 15 | /2 | FOLDER | WORK 2 | F0300000000 | | | | |

Fig. 17

| CONT-EXT NUMBER | CONTEXT IDENTIFIER | ELEMENT NAME | title | ID | JUMPID | whatsNew | text |
|---|---|---|---|---|---|---|---|
| 0 | / | FOLDER | CLASSIFICATION | F0100000000 | | | |
| 1 | /1 | FOLDER | WORK 1 | F0200000000 | | | |
| 2 | /1/1 | DOCUMENT | MANUAL | A0100000000 | | | |
| 3 | /1/1/1 | PART | BASICS | A0101000000 | | | |
| 4 | /1/1/1/1 | CHAPTER | OPERATION | A0101010000 | | | |
| 5 | /1/1/1/1/1 | DOCITEM | | A0101010001 | | | IN THIS CHAPTER, OPERATION WILL BE EXPLAINED. |
| 6 | /1/1/1/1/2 | SECTION | FUNCTION 1 | A0101010100 | | NEWLY ARRIVED | |
| 7 | /1/1/1/1/2/1 | DOCITEM | | A0101010101 | | | IN THIS SECTION, FUNCTION 1 WILL BE EXPLAINED. |
| 8 | /1/1/1/1/3 | SECTION | FUNCTION 2 | A0101010200 | | | |
| 9 | /1/1/1/1/3/1 | DOCITEM | | A0101010201 | | | IN THIS SECTION, FUNCTION 2 WILL BE EXPLAINED. |
| 10 | /1/1/1/1/4 | SECTION | FUNCTION 3 | A0101010300 | | | |
| 11 | /1/1/1/1/4/1 | DOCITEM | | A0101010301 | | | IN THIS SECTION, FUNCTION 3 WILL BE EXPLAINED. |
| 12 | /1/1/1/1/4/2 | DOCITEM | | A0101010302 | | | ※THIS FUNCTION WILL BE SUPPORTED IN Rev 2.0. |
| 13 | /1/1/1/1/4/3 | JUMP | | A0101010303 | A0201010300 | | |
| 14 | CHAPTER /1/1/1/2 | CHAPTER | MAINTENANCE | A0101020100 | | | |
| 15 | PART/1/1/2 | PART | APPLICATIONS | A0102010000 | | | |
| 16 | FOLDER/2 | FOLDER | WORK 2 | F0300000000 | | | |

Fig. 19

| CONT-EXT NUMBER | CONTEXT IDENTIFIER | ELEMENT NAME | title | ID | JUMPID | whatsNew | text |
|---|---|---|---|---|---|---|---|
| 17 | DOCUMENT/2/1 | DOCUMENT | TECHNICAL TERMS | A0200000000 | | | |
| 18 | PART/2/1/1 | PART | BASICS | A0201000000 | | | |
| 19 | CHAPTER /2/1/1/1 | CHAPTER | OPERATION& PROCEDURE | A0201010000 | | | |
| 20 | SENTENCE /2/1/1/1/1 | DOCITEM | | A0201010001 | | | IN THIS CHAPTER, TERMS RELATED TO OPERATION AND PROCEDURE WILL BE EXPLAINED. |
| 21 | SECTION /2/1/1/1/2 | SECTION | REFERENCE <1> | A0201010100 | | | |
| 22 | SENTENCE /2/1/1/1/2/1 | DOCITEM | | A0201010101 | | | IN THIS SECTION, REFERENCE 1 WILL BE EXPLAINED. |
| 23 | SECTION /2/1/1/1/3 | SECTION | REFERENCE <2> | A0201010200 | | | |
| 24 | SENTENCE /2/1/1/1/3/1 | DOCITEM | | A0201010201 | | | IN THIS SECTION, REFERENCE 2 WILL BE EXPLAINED. |
| 25 | SECTION /2/1/1/1/4 | SECTION | REFERENCE <3> | A0201010300 | | | |
| 26 | SENTENCE /2/1/1/1/4/1 | DOCITEM | | A0201010301 | | | IN THIS SECTION, REFERENCE 3 WILL BE EXPLAINED. |
| 27 | CHAPTER /2/1/1/2 | CHAPTER | MAINTENANCE | A0201020100 | | | |
| 28 | PART/2/1/2 | PART | APPLICATION | A0202010000 | | | |

Fig. 20

| ENCODE TARGET | ENCODE RESULT |
|---|---|
| & | & |
| < | > |
| > | < |

Fig. 21

DOCUMENT PROCESSING METHOD, RECORDING MEDIUM, AND DOCUMENT PROCESSING SYSTEM

BACKGROUND

1. Technical Field

The present invention relates to a method or a system for processing a structured document having a structure such as classification and sectioning, and, in particular, to application of a template for structured documents.

2. Related Art

Structuring of electronic documents using a markup language such as XML (extensible Markup Language) or HTML (HyperText Markup Language) or using a language that has a similar description capability has become common practice, in order to facilitate processing and reuse of an electronic document. When a structured electronic document (hereinafter simply referred to as "structured document") is reused, another document is created from information included in the structured document by applying a template to the structured document.

In actual use of the structured document, there is a demand to select necessary portions from multiple structured documents and assemble these portions to create various electronic documents corresponding to various objects and uses. For example, a user may wish to create parts of a product manual separately as structured documents and to create a manual in a format for printing or distribution (for example, PDF (Portable Document Format) format) from the structured documents of the parts, or to create a manual including one or multiple HTML documents for presentation as a webpage or the like.

When files of multiple structured documents forming the basis for the individual electronic documents corresponding to the objects and the use are to be stored, the files are classified into and stored in a group of folders having a hierarchical structure for file management purposes. In many cases, the hierarchical structure of folders is created on the basis of classification from one or multiple viewpoints, such as the field to which the content of the group of the document to be stored in the folder belongs and attributes of the document such as the section created by the document. Therefore, the hierarchical structure of the folders can be considered to include certain information related to the classification of the structured documents.

SUMMARY

According to one aspect of the present invention, there is provided a document processing method in which a document is created by applying one or more templates to multiple structured documents stored in a folder among a group of folders having a hierarchical structure within a document database, the method including acquiring a first structured document including multiple document elements forming a structure, acquiring information of a hierarchical structure of the folders in the document database, creating integrated structure information by merging the structure of the document elements of the first structured document into a position of a folder, among the hierarchical structure formed by the folders, in which the first structured document is stored, and applying a template to the integrated structure information.

BRIEF DESCRIPTION OF THE DRAWINGS

These and other aspects of the disclosure will become apparent from the following description read in conjunction with the accompanying drawings, wherein the same reference numerals have been applied to like parts and in which:

FIG. 3 is a diagram showing a portion of exemplary directory record data;

FIG. 4 is a diagram showing a remaining portion of the exemplary directory record data;

FIG. 6 is a diagram showing a record content of each node in the parse tree of FIG. 5;

FIG. 8 is a diagram indicating directory record data corresponding to the integrated structure information of FIG. 7;

FIG. 9 is a diagram showing, in the form of a table, example data created as a result of matching between the integrated information structure of FIGS. 7 and 8 and a template (1);

FIG. 14 is a diagram showing another example of the type-template mapping table;

FIG. 15 is a diagram showing yet another example of the type-template mapping table;

FIG. 16 is a diagram showing a portion of another example of directory record data;

FIG. 17 is a diagram showing a remaining portion of the example directory record data of FIG. 16;

FIG. 19 is a diagram showing a portion of another example of directory record data;

FIG. 20 is a diagram showing a remaining portion of the example directory record data;

FIG. 21 is a diagram showing a replacing rule of the XMLEntityEncoding format;

DETAILED DESCRIPTION

A. General Structure of System

Figure 1:
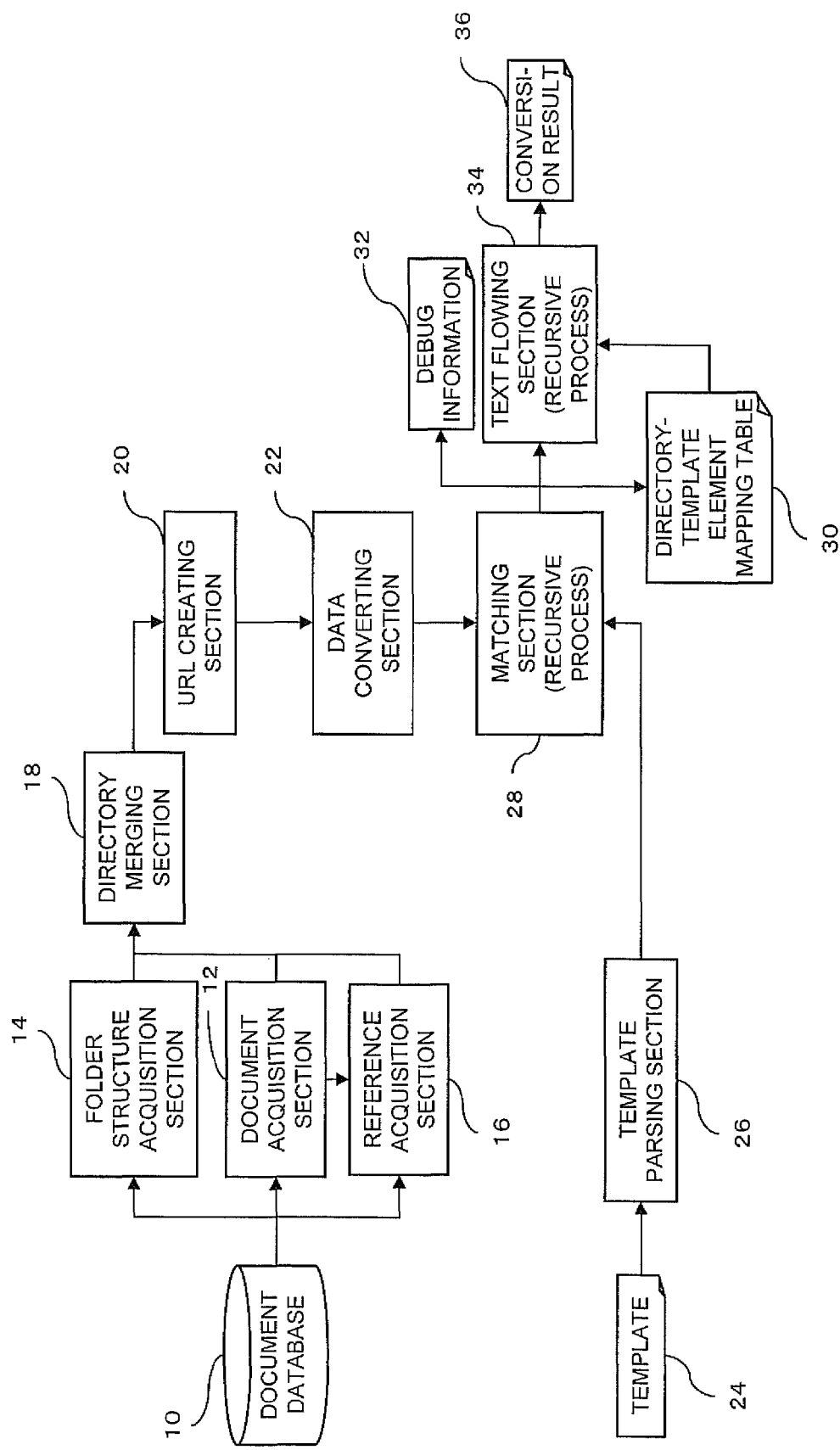
FIG. 1 is a functional block diagram schematically showing the structure of a document processing system.

FIG. 1 schematically shows the structure of a document processing system according to an exemplary embodiment of the present invention. The system includes a document database 10, a document acquisition section 12, a folder structure acquisition section 14, a reference acquisition section 16, a directory merging section 18, a URL creating section 20, a data converting section 22, a template parsing section 26, a matching section 28, and a text flowing section 34.

These sections need not be provided on the same computer and may be provided in a distributed manner over multiple computers which can communicate with each other via a network or the like. It is possible, for example, to provide, among the constituent elements, the document database 10 and the other constituent elements of the system on separate computers so that the other constituent elements obtain necessary data from the document database 10 via a network and apply respective processes.

The document database 10 stores data of multiple structured documents to be processed. In the following description, an example case is described in which the document database 10 stores files of XML documents which are one type of structured document. However, as will be appreciated by a person with ordinary skill in the art from the description below, the document processing system of the exemplary embodiment can be applied to structured documents other than the XML documents.

The document database 10 has folders (directories) that have a hierarchical structure, and each XML document is stored in a suitable folder.

The function of the document processing system will now be described by exemplifying a case in which one or more HTML documents are created to be presented to the public as a webpage, for example, from the multiple XML documents stored in the document database 10. However, as will be appreciated by a person with ordinary skill in the art from the following description, the document processing system described herein can be applied to creation of a document of a format other than the HTML format (including documents other than structured documents).

The constituent elements of the document processing system shown in FIG. 1 can roughly be grouped into two groups. The first group is a group of constituent elements for applying processes in a preparation phase, and the other group is a group for a template processing phase. The group for the preparation phase includes the document acquisition section 12, the folder structure acquisition section 14, the reference acquisition section 16, the directory merging section 18, the URL creating section 20, and the data converting section 22. The group for the template processing phase includes the template parsing section 26, the matching section 28, and the text flowing section 34. The constituent elements for these phases and the processing at these elements will now be described in sequence.

B. Preparation Phase

In the example case, a structure of a document of interest within the document database 10 and the hierarchical folder structure of the document database 10 are merged to create integrated structure information, and a template is applied to the integrated structure information. When the document of interest refers to another document, the structure of the referred document is incorporated into the integrated structure information. In the preparation phase, such integrated structure information is created. In the example case described herein, the created integrated structure information is converted into a form of directory record data (details of which will be described later) which is suited for template processes. The constituent elements for the preparation phase will next be described.

The document acquisition section 12 receives a designation of an XML document from which a HTML document is to be created, and acquires the corresponding document from the document database 10. Specifically, the corresponding document is stored in the document database 10 in the XML format, and the document acquisition section 12 acquires the designated XML document. The XML document to be acquired can be designated, for example, by the user from a user interface screen of a file system managing the document database 10. In another example structure, the user creates a table that designates the target to which the template is to be applied (hereinafter referred to as "mapping table") and, when the user inputs the mapping table to the document processing system, the document acquisition section 12 acquires from the document database 10 a document corresponding to the condition indicated in the mapping table (this process will be described later by reference to a specific example case). The document acquisition section 12 may convert the acquired XML document to a structured record. Examples of formats of the structured record include, for example, a DOM (Document Object Model) tree.

In the example case, "Document 3" in the document database 10 is designated, and the following "Document 3" in the XML format is obtained.

```
<BOOK title="Document 3">
    <PART title="Problem off Prior Art" ID="A030100">
        <CHAPTER title="Prior Art" ID="A030101">
```

In a layout process of structured document processing in prior art, as is described in

```
            <JUMP JUMPID="A010200"> Reference
1</JUMP>, ...
        </CHAPTER>
        <CHAPTER title="Problem" ID="A030102">
            <SECTION title="Cost" ID="A030102_1">...</SECTION>...
        </CHAPTER>
    </PART>
    <PART title="Proposal of New Technique" ID="A030200">...</PART>...
</BOOK>
```

In this example case, the BOOK element indicates an XML document and has a title ("title") as an attribute. A BOOK (document) can include zero or more "PART" elements (that is, "Part" in a chapter structure), a PART element can include zero or more "CHAPTER" elements, and a CHAPTER element can include zero or more "SECTION" elements. Each of the BOOK, PART, CHAPTER, and SECTION elements may include a text (text string) element.

This example case is based on a hierarchical chaptering of book-part-chapter-section. In the following description, each document in the document database 10 is assumed to be created in advance according to such chaptering structure. However, as is appreciated by a person with ordinary skill in the art, the structure of the documents stored in the document database 10 is not limited to the above-described structure, and the documents only need to correspond to a common hierarchical chaptering structure.

The attribute "ID" is identification information of the book element, and an identifier that allows unique identification of the book element within the database 10 may be used.

The structure of the XML document and a DOM tree are structurally equivalent, and a method for determining the DOM tree from the structure of the XML document is well known. Therefore, the DOM tree corresponding to the "Document 3" will not be shown.

The folder structure acquisition section 14 acquires from the document database 10 the folder (directory) structure for organizing the documents. In the folder structure data of XML format, a document or a folder becomes an element, and a folder or a document contained in a certain parent folder becomes a child element of the element corresponding to the parent folder. In response to a request from the folder structure acquisition section 14, the document database 10 returns the internal folder structure in the above-described XML data format. A method for creating the data of the above-described format from the folder structure is well known and will not be described here. The folder structure acquisition section 14 may have a function to convert the acquired folder structure into a DOM tree.

An example of the folder structure data in the XML format is shown below.

```
<FOLDER NAME="Folder 1">
    <FOLDER NAME="Folder 2">
        <DOCUMENT NAME="Document 1" />
        <DOCUMENT NAME="Document 2" />
    </FOLDER>
    <FOLDER NAME="Folder 3">
        <DOCUMENT NAME="Document 3" />
    </FOLDER>
</FOLDER>
```

Figure 2:
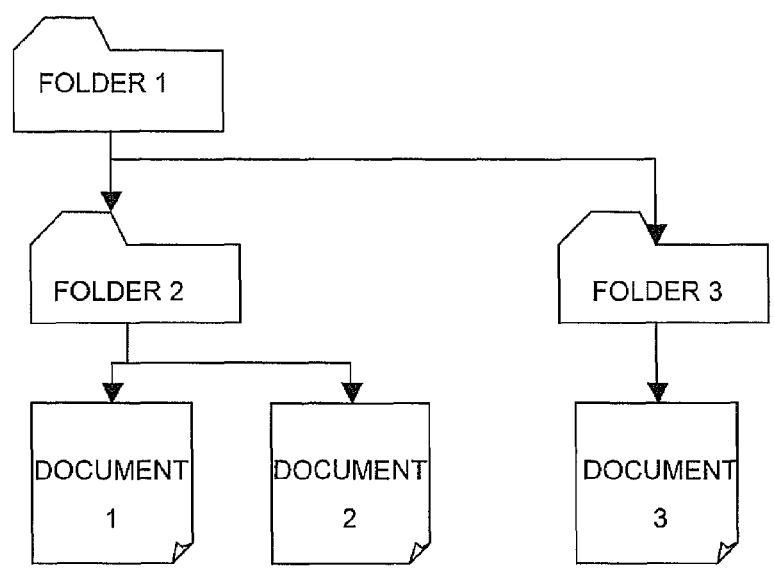
FIG. 2 is a diagram exemplifying a hierarchical folder structure.

As shown in FIG. 2, this example structure indicates a folder structure in which "Folder 2" and "Folder 3" are child elements of "Folder 1", "Document 1" and "Document 2" are child elements of "Folder 2", and "Document 3" is a child element of "Folder 3". Each "FOLDER" element has a name, "NAME", as an attribute and can have, as a child element, a "FOLDER" element or a "DOCUMENT" element. Each "DOCUMENT" element indicates one document in a management unit in the document database 10 and has a name, "NAME", as an attribute.

The reference acquisition section 16 acquires another XML document referred to, from inside of the target document acquired by the document acquisition section 12. The reference acquisition section 16 may acquire the structured record of the target document from the document acquisition section 12 and acquire the other document referred to from the target document based on the information of the structured record. The reference to the other document is represented by, for example, a JUMP element in the case of the "Document 3" described above. The referenced document is an XML element having, as the ID attribute value, a value which is identical to the attribute value of the JUMPID attribute of the JUMP element. Because the "Document 3" includes a JUMP element having a reference to an element having an ID attribute value of "A010200", the referenced document is the element having an ID attribute value of "A010200". The reference acquisition section 16 acquires from the document database 10 the XML document including the referenced element.

More specifically; the reference acquisition section 16 traverses, for example, the DOM tree of the target document acquired from the document acquisition section 12 and determines a value of JUMPID for each JUMP element that has been found. Because the DOM tree and the XML document are equivalent, it is also possible to parse the XML document itself and determine the JUMPID when the load imposed by the calculation process does not present a problem. Then, the reference acquisition section 16 searches the document database 10 for a document including an element having the value of the JUMPID as the ID attribute value and acquires the document. The acquired referenced document may be converted to the DOM tree. There may be cases where the target document does not contain any referenced document (such as when there is no JUMP element) or where multiple referenced documents are present.

In the example of "Document 3", the number of referenced documents is one. Here, as an example, it is assumed that the referenced document is "Document 1" having the following structure.

```
<BOOK title="Document 1">
    <PART title="Problem of Prior Art" ID="A010100">...</PART>
    <PART title="Proposal of New Technique" ID="A010200">...</PART>...
</BOOK>
```

The directory merging section 18 merges a structure of the target document acquired by the document acquisition section 12 and the structure of the referenced document acquired by the reference acquisition section 16 to the folder structure created by the folder structure acquisition section 14. The merging of the structures in this process can be achieved by, for example, merging the DOM trees. In other words, in the merging process, elements of the offspring of the root element "BOOK" in the DOM tree of the target document and the referenced document are inserted as child elements of each node (element) indicating the target document and the referenced document on the DOM tree of the folder structure. In other words, in this process, the elements of the target document and the referenced document in the folder structure are replaced with the overall tree structure of the document having the root element of "BOOK" of the document as the vertex (that is, a tree made of "BOOK" and offspring elements of "BOOK")

Thus, in the example with the "Folder 1", target document "Document 3", and referenced document "Document 1", the tree structure of the PART element which is the child element of the BOOK element of each of the DOM trees of Document 3 and Document 1 and offspring elements thereof are inserted below each DOCUMENT element corresponding to "Document 3" and "Document 1" in the DOM tree of "Folder 1". As a result, the following structure is obtained.

```
<FOLDER NAME="Folder 1">
    <FOLDER NAME="Folder 2">
        <DOCUMENT NAME="Document 1">
            <PART title="Problem of Prior Art" ID="A010100">...</PART>
            <PART title="Proposal of New Technique" ID="A010200">...</PART>...
        </DOCUMENT>
        <DOCUMENT NAME="Document 2" />
    </FOLDER>
    <FOLDER NAME="Folder 3">
        <DOCUMENT NAME="Document 3">
            <PART title="Problem of Prior Art" ID="A030100">
                <CHAPTER title="Prior Art" ID="A030101">
```

In the layout process of a structured document process of the prior art, as is described in <JUMP JumpID="A010200">Reference 1</JUMP>, . . .

```
                                                      <JUMP
    JUMPID="A010200">Reference 1</JUMP>, ...
            </CHAPTER>
            <CHAPTER title="Problem" ID="A030102">
                <SECTION title="Cost" ID="A030102_1">...</SECTION>...
            </CHAPTER>
        </PART>
        <PART title="Proposal of New Technique"
```

```
        ID="A030200">...</PART>...
      </DOCUMENT>
    </FOLDER>
  </FOLDER>
```

In this description, the XML format is shown in order to avoid complexity, but the XML format is equivalent to the DOM tree. In the above, the merging process of the folder structure and the document structure is described as being performed in the DOM tree, but the merging process is not limited to such a configuration, and the structures of the XML formats may be merged when the load imposed by the calculation process does not present a problem. The exemplified structure will hereinafter be referred to as "example structure (a)".

In the following description, the structure in which the document structure of the target document (and the document structure of the referenced document, if any) is merged to the folder structure of the document database 10 will be referred to as integrated structure information.

The URL creating section 20 sets a URL attribute for all elements having an ID attribute among the integrated structure information created by the directory merging section 18. The URL attribute is used for designating the URL of the data created as a result of application of a template to the element (details will be described later). An example configuration in which multiple URL attributes are set for one element will be described later in an alternative configuration. Here, the URL attribute which is set in this process is referred to as "url__1" attribute indicating that the URL attribute is a first URL attribute. The URL creating section 20 sets the attribute value of the url__1 attribute to be added to the element to, for example, "<attribute value of ID>.html" using the ID attribute of the element. This configuration, however, is only exemplary and the attribute value of the url__1 attribute may be created on the basis of any rule, so long as the element and the file at the URL indicated by the url__1 attribute can be correlated in a one-to-one relationship.

In one exemplary configuration, the url__1 attribute can be set by traversing the DOM tree indicating the integrated structure information, newly adding the url__1 attribute to all elements having an ID attribute, and setting the attribute value to "<attribute value of ID>.html". Alternatively, it is also possible to add the URL attribute in a similar manner to the integrated structure information of the XML format, and not the DOM tree.

The result of the process applied by the URL creating unit 20 with respect to the example structure (a) is shown in the following. The integrated structure information is shown in the form of an XML document, but a person with ordinary skill in the art will easily understand a DOM tree which is equivalent to the XML format.

```
<FOLDER NAME="Folder 1">
  <FOLDER NAME="Folder 2">
    <DOCUMENT NAME="Document 1">
      <PART title="Problem of Prior Art" ID="A010100"
 url__1="A010100.html">...</PART>
      <PART title="Proposal of New Technique" ID="A010200"
 url__1="A010200.html">...</PART>...
    </DOCUMENT>
    <DOCUMENT NAME="Document 2" />
  </FOLDER>
  <FOLDER NAME="Folder 3">
    <DOCUMENT NAME="Document 3">
      <PART title="Problem of Prior Art" ID="A030100"
 url__1="A030100.html">
        <CHAPTER title="Prior Art" ID="A030101"
 url__1="A030101.html">
```

In the layout process of a structured document process of the prior art, as is described in <JUMP JumpID="A010200">Reference 1</JUMP>, . . .

```
                                              <JUMP
 JUMPID="A010200">Reference 1</JUMP>, ...
        </CHAPTER>
        <CHAPTER title="Problem" ID="A030102"
 url__1="A030102.html">
          <SECTION title="Cost" ID="A030102__1"
 url__1="A030102__1.html">...</SECTION>...
        </CHAPTER>
      </PART>
      <PART title="Proposal of New Technique" ID="A030200"
 url__1="A030200.html">...</PART>...
    </DOCUMENT>
  </FOLDER>
</FOLDER>
```

The data converting section 22 creates data called "directory record data" from the XML document (or the corresponding DOM tree) created by the URL creating section 20. The directory record data is one form of representation of the integrated structure information and is equivalent in contents to the integrated structure information represented in the XML document or the DOM tree. As shown in FIGS. 3 and 4, the directory record data are a collection of records including multiple attribute values. FIGS. 3 and 4 show directory record data indicating the integrated structure information exemplified above and show one set of directory record data in two separate drawings.

One line of the directory record data corresponds to a record in the directory record data, which in turn corresponds to one element (a folder element or a book element) in the integrated structure information. A record includes attributes of a context number, a context identifier, an element name, "text" (text content), "NAME", "title", ID, url__1, and JUMPID. Among these attributes, "NAME", "title", ID, url__1, and JUMPID are attributes the element has in the integrated structure information and are already described. These attributes are data stored as attributes of the book elements such as the target document and referenced document, or as attributes of each folder.

The context number, context identifier, element name, and "text" are attributes created by the data converting section 22 from the integrated structure information in the XML format or DOM tree format. "Context" refers to a record in the directory record data which corresponds to one element in the integrated structure information (that is, a folder element or book element in a folder structure or a book element in a document structure). The context number is an identification number attached to the context by the data converting section 22. The context number may be assigned, for example, in a form of consecutive numbers to the contexts appearing in one integrated structure information, although the context number is not limited to this format. The context identifier is identification information indicating a position occupied by the context (that is, the element) in the tree structure of the integrated structure information. In the illustrated structure, the position of the context seen from the root is shown in a form similar to the representation of the directory path in a file system (example rule for creating the context identifier will be described later). The element name represents the element name of each element in the integrated structure information in the XML format or the DOM tree format; that is, a tag name in the XML and can be extracted from the tag. "Text" is data of a text string contained in the target document and in the referenced document.

The data converting section 22 creates such directory record data through the following process.

1. All elements of the integrated structure information (for example, XML document indicating the integrated structure) are checked and all attributes appearing in the integrated structure information are listed (here, a set of attributes of a record is created by adding attributes of "context number", "context identifier", "element name", and "text" to the listed attribute).

2. A record is created for each element in the sequence of appearance in the integrated structure information. The values of the attributes of the record created in this process are determined in the following manner.

As the "Context number", consecutive values of 0, 1, 2, . . . are attached for each record to be created.

As the "context identifier", "/" is attached to a root element of the integrated structure information. For other elements, for example, when the context identifier of a parent element is "<PC>" and the element is an nth child element of the parent element, a context identifier of "<PC>/n" will be attached to the element. When the parent element is the root element, a context identifier of "/n" is attached. It is also possible to use an arbitrary text string which can be uniquely identified among child elements in place of the value n.

As the "element name", the element name of the element is set.

As the "text", the remaining portion obtained by removing other elements from the contents of the element is attached.

Regarding the other attributes listed form the integrated structure information, if the element has the attribute, the value of the attribute is set. On the other hand, when the element does not have the attribute, the value of the attribute is left empty.

FIGS. 3 and 4 exemplify example directory record data created by the data converting section 22 based on the example output result of the URL creating section 20 described above. The example set of directory record data of FIGS. 3 and 4 also shows records corresponding to the elements in the portion omitted and replaced with " . . . " in the example output result of the URL creating section 20.

In the next phase, a template process is applied to the directory record data created by the data converting section 22, in the manner. The template processing phase will now be described.

C. Template Process Phase
(C1) Template Parsing

This phase is executed by the template parsing section 26, the matching section 28, and text flowing section 34. An input to this phase is a group of a template 24, directory record data created by the data converting section 22, and a context number which designates a particular record on the directory record data which is to be a base point for the template process. The template 24 to be used may be designated by a user or may be automatically selected on the basis of a correspondence relationship shown in the type-template mapping table (details will be described later). The context number to be a base point for the template process may be designated by the user or may be determined from the correspondence relationship shown in the type-template mapping table (details will be described later). In the template process phase, a result of evaluation of the template 24 is output as a text string.

The template 24 to be used in this phase is, for example, a text file described according to a predetermined grammar. The template is placed in a file system that can be accessed from the document processing system or stored in a predetermined template database.

As an example, the template 24 is formed of the following syntax elements.

---

```
<template> ::= <string of template elements>
<string of template elements> ::= <string of template elements>
<template element>
<template element> ::= <text element>
        |<variable element>
        |<repetition element>
        |<selection element>
        |<directory element>
        |<encode element>
<repetition element> ::= '{{'<string of template elements>'}}'
<selection element> ::= '[['<string of template elements>']]'
<directory element> ::= '#directory' <conditional expression>
<string of template elements> '#end'
<encode element>::='#encode' <encode format> <template element>
'#end'
<variable element> ::= '$' <variable name> '.' <attribute name>
'$'
<text element> ::= <text string which does not include $, {, },
[, or ]>
<variable name> ::= <string of letters and/or numerals>
<attribute name> ::= <string of letters and/or numerals>
<conditional expression> ::= <variable element> '==' <constant>
| <variable element>
<constant> ::= <text string which does not include a quotation mark
(")>
<encode format> ::= <text string which does not include $, {, },
[, or ]>
```

---

Specifically, the template 24 is a string of template elements, and the string of template elements is defined as a structure in which a template element is merged to a string of template elements. The template element corresponds to a text element, a variable element, a repetition element, a selection element, a directory element, or an encode element. The repetition element in this example configuration is an expression in which a string of template elements is surrounded by double braces '{ {' and '} }' and indicates that the string of template elements is repeatedly applied. The selection element in this example configuration is an expression in which a string of template elements is surrounded by double brackets '[ [' and '] ]' and indicates that the entire string of template elements is selectively output or not output under certain conditions. The directory element is an element for instructing a movement of a current context and will be described in detail later. The encode element is an element for instructing replacement of a character according to an encoding method, and will also be described in detail later. The variable element is shown with the variable name and the attribute name and is expressed by surrounding the variable name and the attribute name with "$". When the variable name matches the element name of the context, the value of the attribute, among the attributes in the context, that matches the attribute name of the variable element is assigned to the variable element. The text element is a text string that does not contain special characters that are used in the template grammar for indicating the variables and various elements. The variable name and the attribute name are strings made of letters and numerals. The conditional expression can describe a condition that the combination of the element name and the attribute name is equal to a constant. The constant is a text string (but cannot include quotation marks (")) and is expressed by surrounding the text string with the double quotation marks.

In the grammar based on the above-described creation rule, each of the template, the selection element, the repetition element, the directory element, and the encode element can have a child template element on the parse tree.

The template parsing section 26 parses such a template and obtains a parse tree. When the following exemplary template (hereinafter referred to as "template (1)") is given, the parse tree will have a structure shown in FIG. 5.

```
Table of Contents
{{$SECTION.title$[[($SECTION.whatsNew$)]];
}}
```

Figure 5:
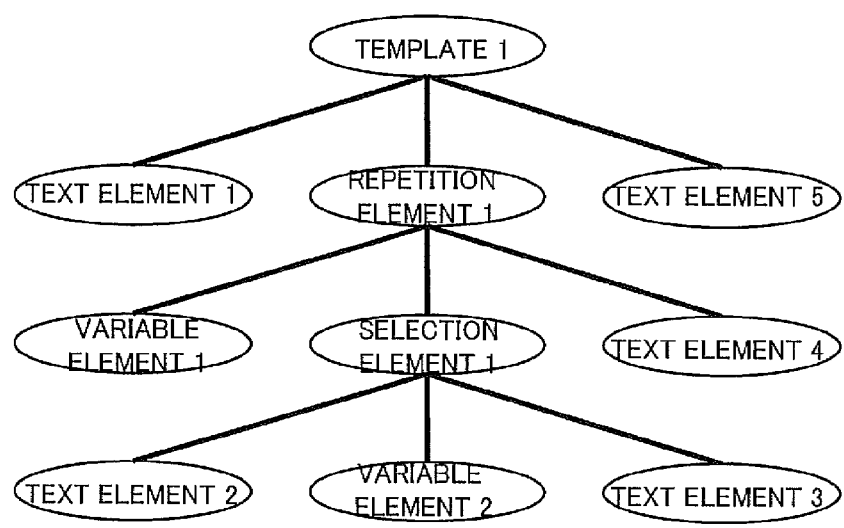
FIG. 5 is a diagram exemplifying a parse tree obtained by parsing a template.

A record content of each node (element of template) in the parse tree of the exemplified template is shown in FIG. 6. Here, a node ID is identifier information of the node and, in this example configuration, a text string is used in which "E" is attached to a head of a number indicating the order of passing the node when the tree is traversed in preorder from the root (with the number of the root node being 0). A node label is a label name of the node and, in this example configuration, the label name shown in FIG. 5 is shown. A node type indicates to which type of the template element the node corresponds in the template elements described above. A node value is a text string of the node (template element) within the template 24. In the exemplified configuration, "<line feed (LF)>" indicates a line feed (LF) character.

In the template process phase, two path processes including the matching process and the text flowing process are performed. The matching process is performed by the matching section 28, and the text flowing process is performed by the text flowing section 34. First, the matching process will be described.

(C2) Matching Process

In the matching process, matching is determined between directory record data on a line of the context number of interest within the directory record data (hereinafter referred to as "current context") and a template element in the template. The determination result is one of "<determined>", "<assignable>", and "<non-assignable>".

The object of the matching is to determine "which context of the directory record data is to be matched with which variable element in the template" and to calculate "which template element should be repeated how many times in order to match the directory record data and the parse tree of the template".

The determination result of "<determined>" indicates that the template element can be matched regardless of the value of the directory record data. For example, the node E1 in the template parse result shown in FIG. 6 is a text element and is a fixed text string (standard portion) in the template. Such a standard portion is fixed even when the target to which the template is to be applied changes, and must be used regardless of the application target of the template. Thus, such an element is determined in the matching process as always matching.

The determination result of "<assignable>" indicates that the template element matches the directory record data in the current context. In other words, in this case, the attribute of the current context can be assigned to the template element.

The determination result of "<non-assignable>" indicates that the template element does not match the directory record data in the current context.

A process executed by the matching section 28 will now be described. The matching section 28 first designates the root node R of the template 24 as a node of interest E, designates a current text C on the directory record data, and recursively performs the following process. The current context changes in the following process, and the first current context (initial context) is determined, for example, by the user explicitly designating the initial context. Alternatively, it is also possible to select, as the initial context, a context that matches a search condition input by the user. Moreover, it is also possible to select, as the initial context, a context corresponding to an element indicated in a type-template mapping table (to be described later) The processes in the matching process will now be described in sequence. The matching section 28 recursively executes the following processes using a pair consisting of the root node R of the template 24 and the initial context as a starting point.

1. When the node of interest E is a text element, the determination value is <determined>.

2. When the node of interest E is a variable element, the element name designated by the variable element is searched with the current context C as a base point. When a context V of the directory record data which matches the conditions shown in node E is found (for example, when the element names match) as a result of the search and a value v of the attribute designated by the variable element is not an empty text string, the determination result is <assignable>, and v is recorded. Otherwise, the determination result is set to <non-assignable>.

The search method used in this process may be changed according to the description and interpretation of the variable. For example, when the variable element is designated by a pair consisting of the variable name and the attribute name (for example, "CHPATER.title") as described above, a search may be performed in the tree of the integrated structure information from the current context toward the parent node, limited to the context on the path to the root, and, when a context having the element name matching the variable name of the node E (for example, "CHAPTER") is found, the context may be determined as the search result. The search is performed toward the parent node because, for example, there may be cases in which an attribute or the like with respect to an element of a certain level is incorporated into an ancestor element in some structures of the document such as, for example, description and attribute with respect to a "chapter" being incorporated in the title number of the "section" (for example, when the title number of the third section of the second chapter is set as "section 2.3"). Among the attributes of the context of the search result found as a result of the search, the value of the attribute corresponding to the attribute name of the variable element is determined as a value assigned to the variable element.

In another example search method, the variable name is configured to allow description of a path pattern such as "CHAPTER/SECTION" and a context that matches the path pattern (SECTION immediately below CHAPTER) is determined as the search result. In yet another example search method, the direction of search may be designated not only toward the ancestor, but also toward the offspring. For example, when a predetermined text string such as "./" is attached to the head of the variable name, the direction of search is set toward the offspring. For example, when the variable name is "./CHAPTER/SECTION", the matching section 28 searches for contexts in which the element name of the current context is CHAPTER and the element name of the child context is SECTION, in numerical order, among the contexts which are offspring in the tree of the integrated structure information from the current context.

3. When the node of interest E is the selection element and the string of template elements of the children of the node E is {E1, ..., Ek} (wherein k is an integer greater than or equal to 1), determination is recursively made with each Ei of the string of the template elements {E1, ..., Ek} (i is an integer from 1 to k) as a new node of interest E in the current context. As an example, the determination is performed by OR (logical sum) combination of <non-assignable>. That is, for each Ei, when any of the determined value of E1, ..., Ek is <non-assignable>, the determination value of E is <non-assignable>. When all of the determination values of E1, ..., Ek is <determined>, the determination value of E is <determined>. In all other cases, the determination value is <assignable>. With this process, the current context is selected as the context matching the selection element only when all of the child elements of the selection element are determined as <assignable> or <determined> in the current context.

4. Processes when the node of interest E is a repetition node will be described now. Assume that the string of template elements of the children of the node of interest E is {E1, ..., Ek} and that the string of contexts of the children of the current context C is {C1, ..., Cm}. The current context is moved in the sequence of C1, ..., Cm. Then, determination is recursively made of the string of template elements Es={E1, ..., Ek} for the current context Ci (i is an integer from 1 to m) at that point. In one example configuration, the determination is performed by OR combining <assignable>.

The expression of "determination is made of Es for Ci" means the following process. When any of E1, ..., Ek is <assignable> in the context Ci, Ci is selected as a repetition target. Then, among the string of the children of the current context {C1, ..., Cm}, a string of contexts selected as the repetition target is recorded as S={S1, ..., Sn}. When S is not empty, the determination result of the repetition element is <assignable>. When S is empty, the determination result is <non-assignable>. When there is no child of C or there is no child of E, the determination result is <non-assignable>.

With such a process, when any of the children of the current context is selected as a repetition target, the repetition element is determined as <assignable> in the current context. In this manner, in the case of the repetition element, unlike the selection element, the current context is selected as the target of assignment even when a portion of the children of the current context matches. That is, in case of the repetition element, not all of the children of the current context needs to match.

5. When the node E is a directory element, the string of the template elements of the children of the node E is set as {E1, ..., Ek}. In addition, a context that matches the conditional expression of the directory element is searched and collected from the entirety of the directory record data. The contexts that match the conditional expression are set as {C1, ..., Cm} in the sequence in which the contexts are found. The current context is then moved in sequence from C1, ..., Cm and determination of the string of template elements Es={E1, ..., Ek} is made for the current context Ci at that point. In an example configuration, the determination is performed by OR combination of <assignable>. Here, the expression "determination of Es is made for Ci" means that, when any of the E1, ..., Ek is <assignable>, Ci is selected as a movement target of context. A string of contexts that are selected as the movement target is recorded as S={S1, ..., Sn}. When S is not empty, the determination of the directory element is <assignable>. When S is empty, the determination of the directory element is <non-assignable>. When there is no context that matches the conditional expression or there is no child of the node E, the determination is <non-assignable>. The details of the directory element will be described later.

Also, handling of the encode element will be described later in detail.

Figure 7:
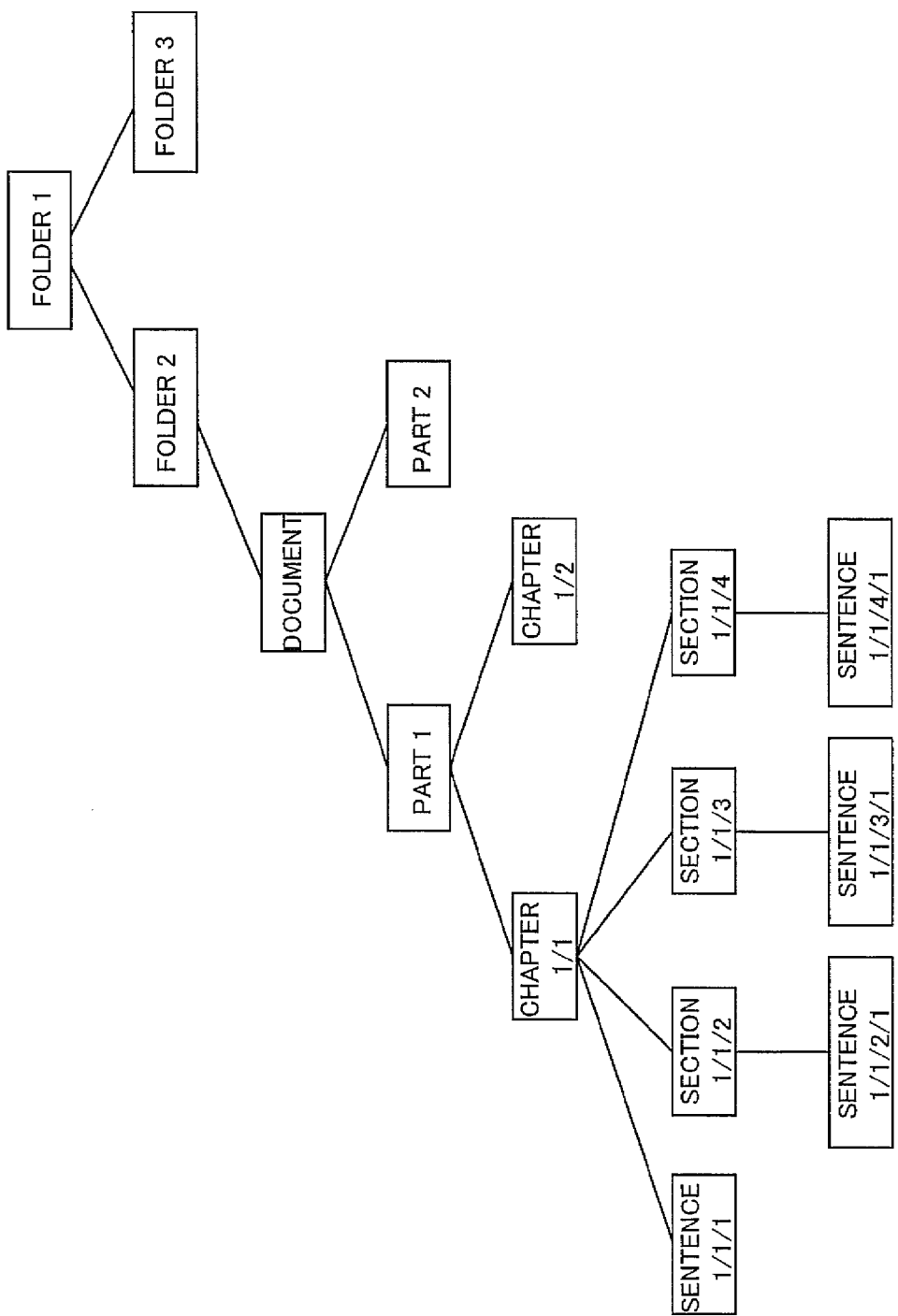
FIG. 7 is a diagram exemplifying integrated structure information using a tree structure.

When the above-described template (1) is applied with respect to integrated structure information having the tree structure as shown in FIG. 7 and directory record data as shown in FIG. 8, with a designation of the initial context being a context number "4", a directory-template element mapping table 30 as shown in FIG. 9 can be obtained (refer to FIG. 1).

In the example configuration of FIG. 8, an attribute called "whatsNew" is present as an attribute of the directory record data. This attribute is one of the attributes set to the element of the XML document to which the process is to be applied or the element of the document referenced from the XML document and indicates that the element is newly arrived information. In the example configuration of FIG. 8, the description of the JUMPID attribute is omitted in order to avoid complexity.

The mapping table of FIG. 9 shows, in sequence, determination results of matching when the template (1) is applied to the current context "4" according to the process as described above, in the sequence of visit to nodes of the template. In the mapping table of FIG. 9, "node number" represents a node of interest and is the portion of the number of the node ID in the parse result of the template of FIG. 6. The "node type" and "variable name" are attributes of the node of interest in the template (identical to those shown in FIG. 6). The "context identifier" is an identifier of the current context at the time of determination shown by the record. In this example configuration, the context "4" which is the initial context (that is, "chapter 1" in FIG. 7) is set as "/1/1" in order to avoid complexity, due to an elongated identifier. The "element name of context" represents the element name of the current context. The "matching determination value" is a value of the result of the matching determination. "Repetition target" indicates an identifier of a child node selected as a target of repetition when the node of interest is a repetition element. "V" indicates the number of the context which matches the condition of the variable element. "v" indicates an attribute value of the matching context. In FIG. 9, records corresponding to nodes having a child element are shaded, in order to facilitate understanding.

Figure 10:
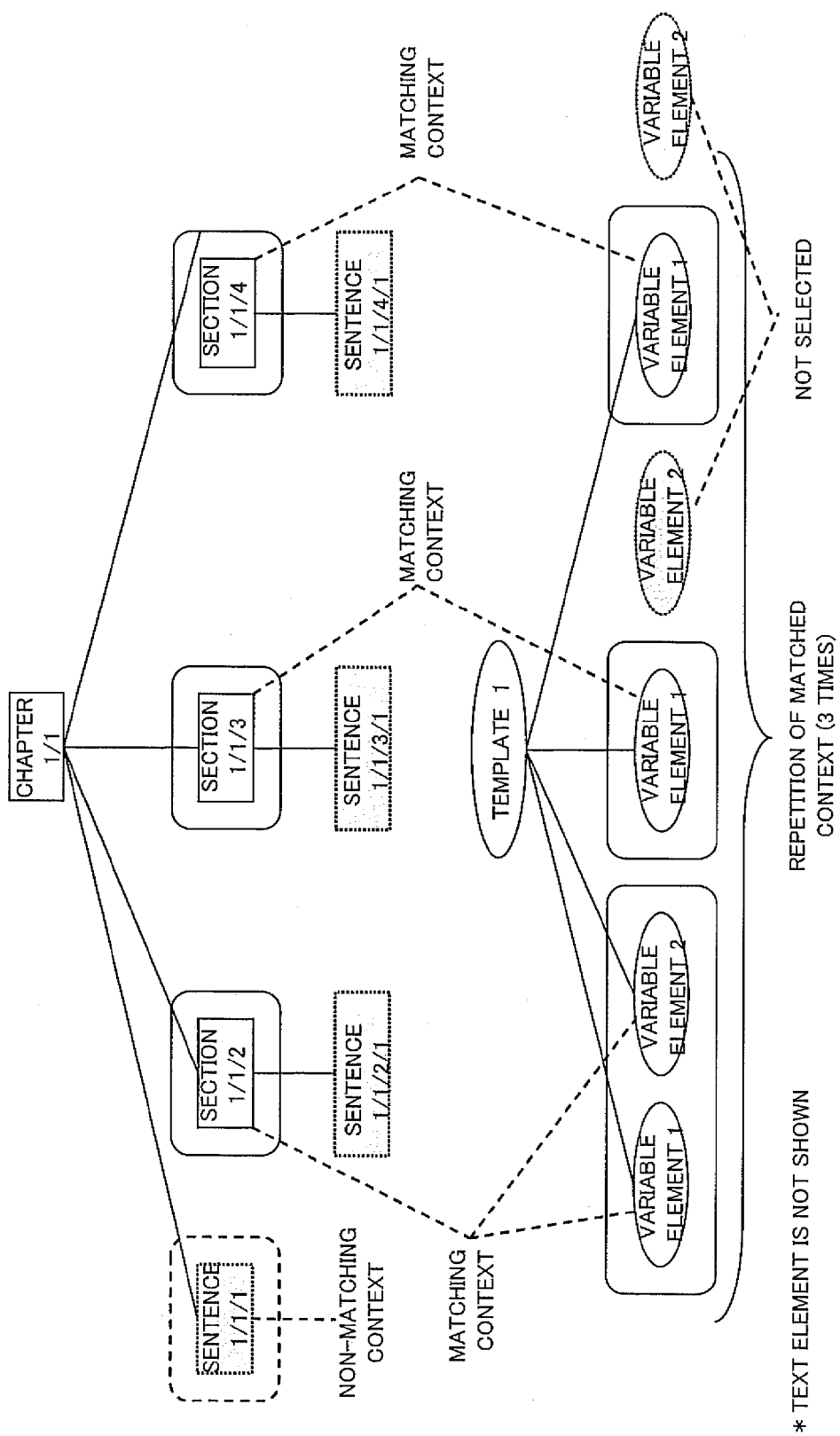
FIG. 10 is a diagram diagrammatically showing a result of matching of the integrated information structure of FIGS. 7 and 8 and the template (1)

FIG. 10 diagrammatically shows the matching result. In this example configuration, the text elements are not shown, in order to avoid complexity. In the example case, "section 1/1/2", "section 1/1/3", and "section 1/1/4" match the "repetition element 1". Of these, because the "section 1/1/2" matches the "variable element 2 ($SECTION.whatsNew$)" in addition to the "variable element 1 ($SECTION.title$)", the "section 1/1/2" is selected in the "selection element 1". Because the "section 1/1/3" and "section 1/1/4" do not have a child element that matches the "variable element 2", these elements are not selected in the "selection element 1".

(C3) Text Flowing Process

A text flowing refers to a process of replacing an attribute value of the directory record data with a variable. The text flowing section 34 applies the text flowing process to a node E in which the determination result of matching between the node E of interest in the template and the current context C on the directory record data is <assignable> or <determined>.

The text flowing section 34 recursively applies the following steps. The following process is only applied to the node having a determination value of <assignable> or <determined> among the data of matching determination result as shown in FIG. 9. The nodes having the determination value of <non-assignable> are skipped.

1. When the node E of interest is a text element, a node value v (text string within the template) is output.

2. When the node E of interest is a variable element, a node value v recorded in the matching process (attribute value of matched variable) is output.

3. When the node E of interest is a selection element, each Ei of a string of the template elements {E1, . . . , Ek} of children of the node E is set as a new node E of interest, a current context C is designated, a node Ei having a matching determination result of <assignable> or <determined> is selected, and the text flowing process is recursively applied.

4. When the node E of interest is a repetition element, the following process is applied. A string of template elements of the children of E is set as {E1, . . . , Ek}. A string of contexts recorded in the matching process is set as {S1, . . . , Sn} and the Si is sequentially selected as the current context. Then, the text flowing process is recursively applied to a node Ei selected from a string of template elements Es={E1, . . . , Ek} which has a matching determination result of <assignable> or <determined>.

5. When the node E is a directory element, the following process is applied. A string of template elements of children of the node E is set as {E1, . . . , Ek}. A string of contexts recorded in the matching process is set as {S1, . . . , Sn} and each Si is sequentially selected as the current context. Then, the text flowing process is recursively applied to Ei selected from a string of template elements Es={E1, . . . , Ek} which has a matching determination result of <assignable> or <determined>.

When the above-described template (1) is applied to the integrated structure information shown in FIGS. 7 and 8, the following text string is obtained as a conversion result 36 (refer to FIG. 1).

| Table of Contents |
| --- |
| Function 1 (Newly Arrived): |
| Function 2: |
| Function 3: |

D. Another Example Configuration

A structure and a process of a document processing system have been described. Next, an example case is described in which the above-described process is applied to generation of a "chapter TOC (table of contents) file" which is a list of headlines of sections included in a chapter in a template process with the chapter element (CHAPTER) as a base point. In the list of headlines of sections, a hyperlink to a contents file of each section will be set.

In this example configuration, the input of the template process is assumed to be the directory record data of FIG. 8. As has already been described, the directory record data set includes the "url__1" attribute attached by the URL creating section 20 to all elements having an ID attribute. Therefore, the URL of the contents file of the section level which is at a lower level than the chapter is already resolved when the chapter TOC file is generated.

An example template for generating the chapter TOC file (hereinafter referred to as "template (2)") is shown below.

```
<HTML>
  Chapter Table of Contents
  {{<A href="$SECTION.url__1$">
```

-continued

```
  $SECTION.title$ [[($SECTION.whatsNew$)]] : </A>}}
</HTML>
```

When a template process is applied using the template and designating a context of number "4" as the initial context C, the generated chapter TOC file would be in the following form.

```
<HTML>
  Chapter Table of Contents
  <A href="A0101010100.html"> Function 1 (Newly Arrived): </A>
  <A href="A0101010200.html"> Function 2: </A>
  <A href="A0101010300.html"> Function 3: </A>
</HTML>
```

As is shown in FIG. 8, the url__1 attribute of the context "4" is "A0101010000.html". Thus, the text flowing section 34 sets the file name of the generated chapter TOC file to "A0101010000.html".

Each HTML file linked from the chapter TOC file can be generated using the following template (hereinafter referred to as "template (3)").

```
<HTML>
  <H3> $SETION.title$ </H3>
  {{<A name="$DOCITEM.ID$"></A>
  <P> $DOCITEM.text$</P>
  }}
</HTML>
```

An HTML file indicating the contents of the section can be generated by applying the template (3) with the context having the element name of "SECTION" as a base point (initial context). In the directory record data of FIG. 8, the contexts of numbers "6", "8", and "10" are "SECTION", and, thus, these contexts are respectively selected as the initial context and the template (3) is applied, to thereby create the contents file for each section. The contents files of the sections to be generated are output with file names of "A0101010100.html", "A0101010200.html", and "A0101010300.html", respectively.

For example, the file contents of the file "A0101010300.html" will look as follows.

```
<HTML>
  <H3> Function 3 </H3>
  <A name="A0101010301"></A>
  <P> In this section, Function 3 will be explained. </P>
  <A name="A0101010302"></A>
  <P> * This function will be supported in Rev 2.0 </P>
</HTML>
```

Figures 11, 12:
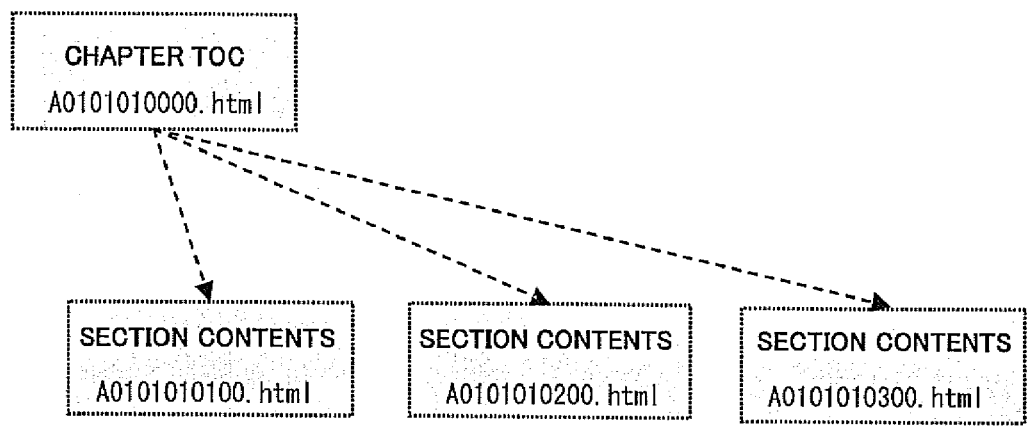
FIG. 11 is a diagram showing a link relationship between a chapter TOC file and section content files.
FIG. 12 is a diagram exemplifying a type-template mapping table.

FIG. 11 shows a file name and reference relationship of a file generated by the above-described template process.

In the example case, the template (2) is applied to the chapter, and the template (3) is applied to the sections so that a chapter TOC file with a link and a contents file of each section linked from the chapter TOC file can be created. In order to configure the system so that the template (2) is applied to the chapter and the template (3) is applied to the section, it is possible, for example, to register a type-template mapping table as shown in FIG. 12 in the document processing system. The mapping table registers a pair consisting of the element name of the integrated structure information (which indicates a type of the element) and the identifier of the template to be applied to the element of the element name. In the example case, the identifier (which is the file name in the example case) of the template (2) is "chapter.html" and the identifier of the template (3) is "section.html". When the document processing system is given the type-template mapping table, the document processing system searches the integrated structure information for an element which matches the element name indicated in the mapping table, selects each of the found elements as the initial context, and applies, to the initial context, the template which forms the pair with the element name in the mapping table.

In this manner, in the exemplary embodiment, a URL attribute (url_1 attribute) created on the basis of the ID attribute in the preparation phase is attached to each element (context) of the integrated structure information and the value of the URL attribute is attached as a file name to a file obtained as a result of application of a template to the element. With such a structure, the file created by the template process is always attached with a unique URL and the URL is known to the document processing system. Therefore, when the URL is requested from an external device, the document processing system can provide the corresponding file. In this manner, by determining the URL of the result of application of the template to the context in the preparation phase and attaching the determined URL to the file of the result of the application of the template, it is possible to facilitate description, in the template, of a link which may change due to various conditions.

In this description, a case is exemplified in which the chapter TOC file and the section contents file are created. By applying a similar idea, it is possible to describe link relationships of various levels in the template. For example, it is possible to create a table of contents in an integrated structure which classifies documents such as a headline list for each document, document TOC, and part TOC. In addition, contents file of various levels can be created in a similar manner.

As described, according to the exemplary embodiment, a hypertext structure which forms a hierarchical structure without a contradiction can be created by applying multiple templates for each hierarchical level of one directory record data, switching from one template to another. Thus, in the exemplary embodiment, a document having a chapter structure or a classification structure can be created by automatically matching the hierarchical data (integrated structure information) and hierarchical control structure (template).

E. Horizontal Application of Templates

In the above-described section D, a case is exemplified in which different templates are selectively applied to different hierarchical levels in the integrated structure information. In this section, a case is exemplified in which multiple templates are applied to the same element.

For example, when a webpage is to be created in which a frame indicating the contents of a chapter is placed next to a frame indicating a table of contents of the chapter, the chapter TOC and the chapter contents must be created from the same "chapter" context. In this case, the chapter TOC and the chapter contents can be created by preparing the template for creating the chapter TOC and a template for creating the chapter contents and applying the templates to the same "chapter". The application of multiple templates to the same context to create multiple different documents in this manner will be referred to as "horizontal" application of templates. Meanwhile, the application of different templates to different hierarchical levels as described in section D will be referred to as "vertical" application of templates.

In the horizontal application, it is possible to configure the system so as to allow suitable links to be formed to a document in the multiple documents created from the same context (for example, the chapter TOC and chapter contents) from the other documents created from the same context. In the following, a system for realizing this configuration will be described.

Figure 13:
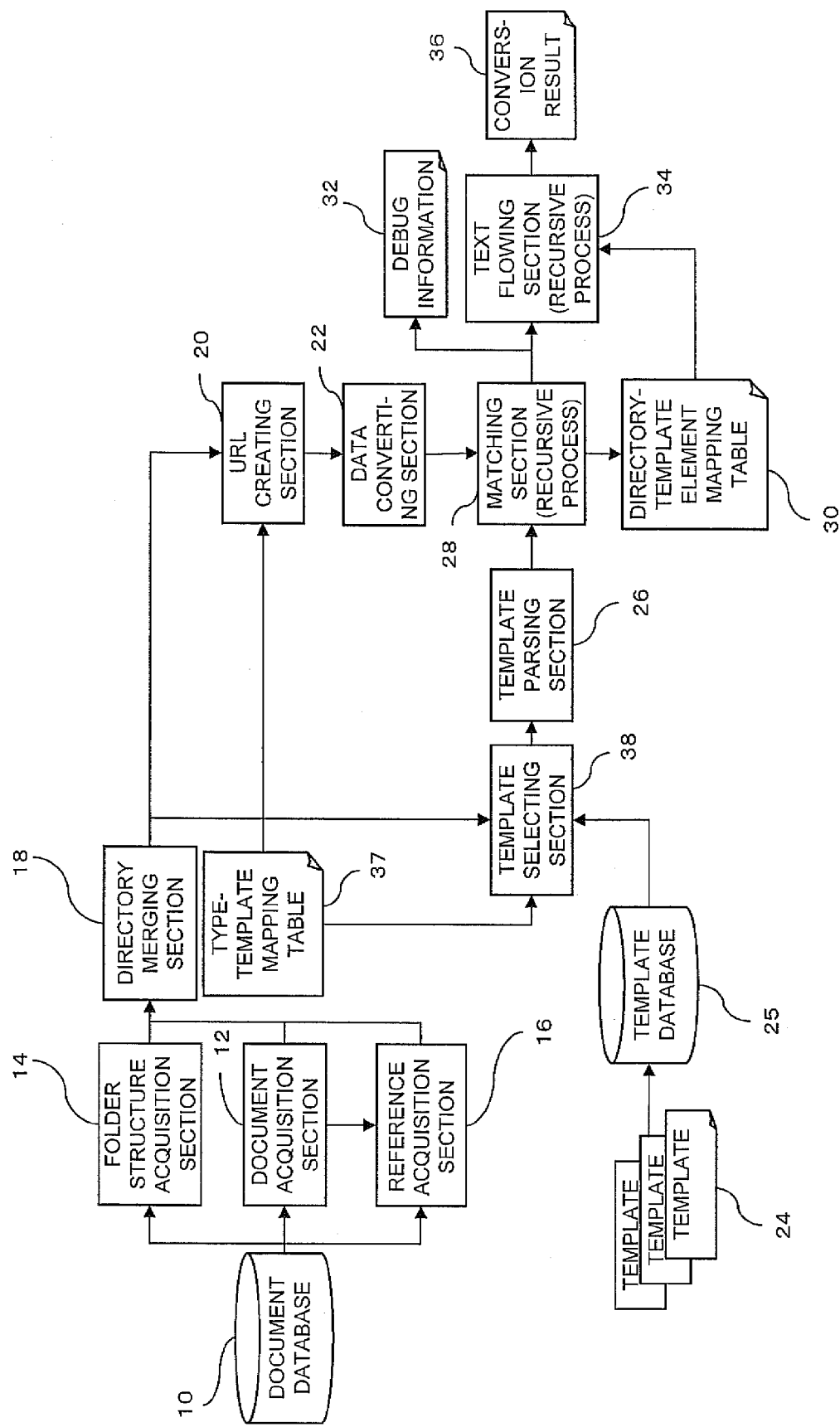
FIG. 13 is a functional block diagram schematically showing a structure of a document processing system that creates multiple documents from a context.

FIG. 13 is a functional block diagram schematically showing a structure of the document processing system. In FIG. 13, those constituent elements having the same or similar functions as the constituent elements of the system of FIG. 1 are assigned the same reference numerals and will not be described again.

The system of FIG. 13 corresponds to the system of FIG. 1, with a template database 25, a type-template mapping table 37, and a template selecting section 38 added.

The template database 25 is a database to which multiple templates are registered. As described in section D, the type-template mapping table 37 is a table to which is registered a pair consisting of the element name in the integrated structure information and the identifier of the template to be applied to the elements of the element name. The type-template mapping table 37, however, differs from the mapping table of section D (FIG. 12) in that multiple template names are registered with respect to the same element name. An example of the mapping table 37 is shown in FIG. 14. In this example configuration, three templates including "frameset.html" for a frame set, "partLeft.html" for a left side frame, and "partRight.html" for a right side frame are registered for a "PART" element. Similarly, two templates including "chapterLeft.html" for a left side frame and "chapterRight.html" for a right side frame are registered for a "CHAPTER" element.

In this system, the URL creating section 20 performs the following processes in the preparation phase in order to incorporate the URL of each frame into the integrated structure information. The URL creating section 20 traverses the integrated structure information (for example, the DOM tree) created by the directory merging section 18 while referring to the type-template mapping tale 37 and newly adds the following attribute for all elements having the ID attribute.

When n templates corresponding to the element (hereinafter referred to as "element of interest") are described in the type-template mapping table 37, the url_1 attribute, the url_2. attribute, . . . the url_n attribute are added, and the attribute values for these attributes are set as "<attribute value of ID>_<template name>".

When no template corresponding to the element of interest is described in the mapping table 37, a closest element having the template described in the mapping table 37 is determined from among the ancestor elements. If the url_1, . . . , url_n attributes have been added (are present) in the determined closest ancestor element, the url_1, . . . , url_n attributes are added to the element of interest also, and the attribute values of these attributes are set to "<attribute value of url_i of the ancestor>#<attribute value of ID>" (wherein i is an integer from 1 to n).

Because the mapping table 37 exemplified in FIG. 14 contains templates corresponding to PART and CHAPTER, attribute values in the form of "<attribute value of ID>_<template name>" are used for these elements. Because there is no template corresponding to the "SECTION", the attribute value is determined from the attribute value of the ancestor element. As the elements of the ancestor of SECTION and corresponding to the template, there are PART and CHAPTER. Because CHAPTER is closer to SECTION than is PART, the value of CHAPTER is used. Therefore, when the mapping table of FIG. 14 is applied to the example structure (a), the URL creating section 20 creates the following data.

```
<FOLDER NAME="Folder 1">
  <FOLDER NAME="Folder 2">
    <DOCUMENT NAME="Document 1" />
      <PART title="Problem of Prior Art" ID="A010100"
          url_1="A010100_frameSet.html"
url_2="A010100_partLeft.html"
          url_3="A010100_part_Right.html">..</PART>
      <PART title="Proposal of New Technique" ID="A010200">
          url_1="A010200_frameSet.html"
url_2="A010200_partLeft.html"
          url_3="A010200_partRight.html">...</PART>...
    <DOCUMENT NAME="Document 2" />
  </FOLDER>
  <FOLDER NAME="Folder 3">
    <DOCUMENT NAME="Document 3">
      <PART title="Problem of Prior Art" ID="A030100">
          url_1="A030100_frameSet.html"
url_2="A030100_partLeft.html"
          url_3="A030100_partRight.html">
        <CHAPTER title="Prior Art" ID="A030101"
            url_1="A030101_chapterLeft.html"
url_2="A030101_chapterRight.html">
          In the layout process of a structured document process
of the prior art, as is described in <JUMP
JUMPID="A010200">Reference 1</JUMP>, ...
        </CHAPTER>
        <CHAPTER title="Problem" ID="A030102">
            url_1="A030102_chapterLeft.html"
url_2="A030102_chapterRight.html">
          <SECTION title="Cost" ID="A030102_1"
              url_1="A030102_chapterLeft.html#A030102_1"
              url_2="A030102_chapterRight.html#A030102_1"
>...</SECTION>...
        </CHAPTER>
      </PART>
      <PART title="Proposal of New Technique" ID="A030200">
          url_1="A030200_frameSet.html"
url_2="A030200_partLeft.html"
          url_3="A030200_partRight.html">...</PART>...
    </DOCUMENT>
  </FOLDER>
</FOLDER>
```

In the layout process of a structured document process Of the prior art, as is described in <JUMP JumpID="A010200">Reference 1</JUMP>, . . .

```
        </CHAPTER>
        <CHAPTER title="Problem" ID="A030102">
            url_1="A030102_chapterLeft.html"
url_2="A030102_chapterRight.html">
          <SECTION title="Cost" ID="A030102_1"
              url_1="A030102_chapterLeft.html#A030102_1"
              url_2="A030102_chapterRight.html#A030102_1"
>...</SECTION>...
        </CHAPTER>
      </PART>
      <PART title="Proposal of New Technique" ID="A030200"
          url_1="A030200_frameSet.html"
url_2="A030200_ partLeft.html"
          url_3="A030200_partRight.html">...</PART>...
    </DOCUMENT>
  </FOLDER>
</FOLDER>
```

With such a process performed by the URL creating section 20, a URL is set for each document created from each element.

Then, in the template processing phase, the template selecting section 38 traverses the integrated structure information and checks whether or not each element in the integrated structure information is described in the mapping table 37. When the element is described in the mapping table 37, the template selecting section 38 searches the template database 25 while using the name of the corresponding template as a key, obtains the corresponding template, and sends the template to the template parsing section 26.

FIG. 15 shows another example of a type-template mapping table 37. With the mapping table 37, three files are created in a template process with the CHAPTER element as a base point. In the example configuration, the first template, "chapterFrameSet.html", is a frame set page including two frames, and files created by the second and third templates, "chapterLeft.html" and "chapterRight.html", are displayed in the frames.

For example, the first template, "chapterFrameSet.html", may have the following contents.

```
<HTML>
<FRAMESET cols="30, *">
<FRAME src="$CHAPTER.url_2$" name="left">
<FRAME src="$CHAPTER.url_2$" name="right">
<FRAMESET>
</HTML>
```

The second template, "chapterLeft.html", may have the following contents.

```
<HTML>
Chapter Table of Contents
{ {<A href="$SECTION.url_1$" target="right" > $SECTION.title$:
<A>
} }
</HTML>
```

The third template, "chapterRight.html", may have the following contents.

```
<HTML>
<H3>$CHAPTER. title$</H3>
{ {<A name="$DOCITEM. ID$"></A>
<P>$DOCITEM. text$</P>
} }
</HTML>
```

FIGS. 16 and 17 show the directory record data created as a result of application of the type-template mapping table exemplified in FIG. 15 to the example structure (a). The set of directory record data is sent to the matching section 28.

Meanwhile, the template selecting section 38 extracts, from the integrated structure information, the element of each element name registered in the type-template mapping table of FIG. 15 and selects each of the extracted elements as the initial context. Then, for each extracted element, the name of the template corresponding to the element is determined from the type-template mapping table, and the database 25 is searched for a template corresponding to the template name. With such a process, multiple pairs consisting of initial context and template are determined and are sent to the template parsing section 26. The template parsing section 26 parses the template in each pair as described above and sends to the matching section 28 a pair consisting of the parse tree obtained through the parsing and the initial context.

The matching section 28 executes the above-described matching process for each pair consisting of the parse tree of the template and the initial context. In response to the result of the matching process, the text flowing section 34 executes the above-described text flowing process for each pair.

In a structure with the mapping table of FIG. 15 and the directory record data of FIGS. 16 and 17, the context "4" is first selected as the initial context, and the first template "chapterFrameSet.html" is applied to the initial context. The contents of the file obtained as a result of this process will look like the following.

```
<HTML>
<FRAMESET>
<FRAME src="A0101020000_chapterLeft.html" name="left">
<FRAME src="A0101020000_chapterRight.html" name="right">
</FRAMESET>
</HTML>
```

Because the file is created from the first template applied to the CHAPTER element, a file name (URL) indicated in the url_1 attribute is attached. In other words, the file name of the file is "A0101010000_chapterFrameSet.html".

Because the second template, "chapterLeft.html", is also associated to the CHAPTER element, the second template is applied to the same context "4". As a result, a file with a file name of "A0101020000_chapterLeft.html" is created with the following contents.

```
<HTML>
Chapter Table of Contents
<A href="A0101010100_section.html" target="right"> Function 1:</A>
<A href="A0101010200_section.html" target="right"> Function 2:</A>
<A href="A0101010300_section.html" target="right"> Function 3:</A>
</HTML>
```

Similarly, the third template, "chapterRight.html", is also associated to the CHAPTER element, and, thus, the third template is applied to the same context "4". As a result, a file is created with a file name of "A0101020000_chapterRight.html" having the following contents.

```
<HTML>
<H3> Operation </H3>
<A name="A0101010001">
<P>In this chapter, operations will be explained. </P>
</HTML>
```

Figure 18:
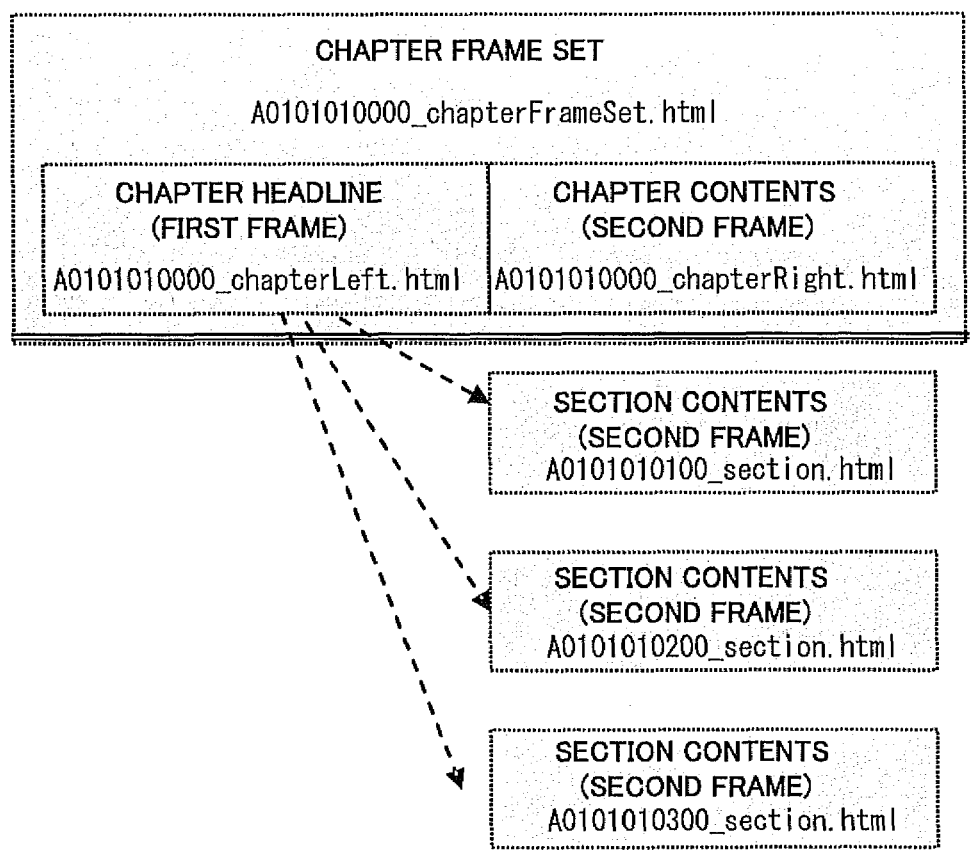
FIG. 18 is a diagram showing a link relationship between files created by applying multiple templates to context "4" of the directory record data of FIGS. 16 and 17.

Regarding the SECTION element, a section content file for each section is created by applying a template similar to the above-described template (3). FIG. 18 shows a relationship between a file created in this manner and a link.

In the above, a case is exemplified in which the chapter table of contents and chapter contents are displayed in a frame format of HTML. However, the horizontal application of templates exemplified herein is not limited to such a case and can be applied to various hierarchical levels of the integrated structure information. Therefore, it is possible to create, for example, a hypertext structure having a hierarchical structure for displaying the table of contents and the contents separately in a first frame and a second frame.

It is clear that this method is not limited to the exemplified frame structure having the frame set, left frame, and right frame, and may be applied to a frame structure having two or more frames in general.

F. Directory Element

The directory element will now be described.

In the above description, the context explicitly instructed by the user or the context that can be determined from the type-template mapping table is set as the initial context and, when the repetition element or the selection element is to be processed, the current context is suitably moved with the initial context as a base point according to the above-described algorithm and a process is recursively applied. The directory element to be described here is an element which is used for moving the current context to a context that is intended by the creator of the template, separately from the movement of the context from the current context to a child context performed in these recursive processes.

For example, when it is desired to include, in a document created with the initial context as a base point, a link referring to a document, a part, a chapter, or a section that matches a condition intended by the creator of the template, a directory element can be incorporated in the template. In the directory element, a text string of '#directory' is followed by <conditional expression> and <string of template elements>, and the element ends with the text string of '#end'. The <conditional expression> is described in a format of "<variable element> '==' <variable element>" or "<variable element> '==' <constant>", and describes a condition for extracting a context such that there is extracted a context having the "variable element" designated at the left side equaling to the value of the "variable element" designated at the right side (must be "assignable" or "determined in the current context") or the "constant" designated at the right side. The system moves the current context to the context that matches the conditional expression. The system then applies the <string of template elements> to the current context after the movement. When multiple contexts are found that match the conditional expression, the current context is sequentially moved to the multiple contexts in sequence, and the <string of template elements> is applied to the current contexts.

An example template including a directory element (hereinafter referred to as "template (4)") may look like the following.

```
$SECTION.title$ :
#directory $*.ID$==$JUMP.JUMPID$
<A                    href="$SECTION.ID$.htm">
$PART.title$:$CHAPTER.title$:$SECTION.title$ </A>
#end
```

In the template (4), as a movement destination of the current context, a line is designated in which the ID attribute value of any element in the directory record data equals the JUMPID attribute value of the JUMP element when evaluated by the current context (asterisk (*) indicates any arbitrary element).

In an example case, the template (4) and the directory record data as shown in FIGS. 19 and 20 are designated, and the context "13" is designated as the initial context. In this case, the context designated as the movement destination in the directory element is the context "25" shown in FIG. 20 and is shown shaded in FIG. 20 for easier understanding.

In this case, the SECTION element of the ancestor of the current context "13" matches the $SECTION.title$ on the first line of the template (4). Then, the current context moves to context that matches "#directory$*.ID$==$JUMP.JUMPID$". In the exemplified case, the JUMPID attribute (JUMP element) of the current context "13" (prior to the movement) matches the right side portion of the conditional expression, "$JUMP.JUMPID$". Thus, "A0201010300", which is the attribute value of the JUMPID attribute, is assigned to the constant. As a result, the conditional expression designates a context having the ID attribute value of "A0201010300". Because the context "25" is found as the context matching the conditional expression, the current context is temporarily moved to the context "25" with the execution of the directory element. With the current context "25" as the base point, a string of template elements described until "#end"; that is, '<A href="$SECTION.ID$.htm">$PART.title$:$CHAPTER.title$:$SECTION.title$ </A>', is applied. In the exemplified case, the ID attribute value of "A0201010300" of the current context "25" matches the variable element, "$SECTION.ID$". Because the next variable element, "$PART.title$", does not match the current context "25", a matching element is searched in the direction toward ancestors in the integrated structure information. In this case, the title attribute of "Basics" of the context "18" is assigned into the template. Similarly, the title attribute of "Operation&Procedure" of the context "19" is assigned to the next variable element, "$CHAPTER.title$". In the final variable element "$SECTION.title$", the title attribute of "Reference<3>" of the current context "25" is assigned. Therefore, the following text string is created with the application of the template (the text string will hereinafter be referred to as a "text string (A)").

| Function 3: |
| --- |
| <A href="A0201010300.htm">Basics: Operation&Procedure: Reference<3></A> |

When multiple movement destinations that match the conditional expression are found, the template process is repeatedly applied to the found contexts as if there is a directory having the matching contexts as members. By configuring in this manner, a virtual directory matching the conditional expression can be formed, and the template process can be applied, and, thus, flexible template process can be provided.

G. Debugging

Next, a debug process in the document processing system will be described.

There may be cases in which the expected template processing result is not obtained due to various mistakes such as an error in the description of various conditions, for example, in the selection element in the template, and when there is data inconsistency including a situation in which the attribute value of the directory record data differs from that conceived by the template creator.

A debug function may be added to the document processing system in order to find such a mistake. The debug function may also be realized as an additional function to the matching section 28. In the debug process, a determination result of matching of template with respect to a current context designated by the user or the like may be output. Such a configuration can facilitate finding the erroneous description of the conditions and data inconsistency as described above.

From the viewpoint of the creator of the template, it is desirable that the determination value serving as the debug output be output in order from the upper level of the hierarchy of the template elements toward the offspring. However, the matching process includes a recursive processing step in which the determination value of a certain node is determined only after one or all of the determination values of the template elements of the lower hierarchical level (offspring) is determined. Therefore, if the matching determination result is to be output according to such a processing order, it would be difficult for the creator of the template to understand the results.

In consideration of this, a global variable (WATCH_MODE) is provided in the processing step of the matching section 28. The variable WATCH_MODE may take a value of "true" or "false". When "WATCH_MODE=true", the processing steps of the matching section 28 are changed so that a dummy matching process is applied for outputting a debug output prior to the actual matching process in order to determine the matching determination value. When the determination value is determined, the attribute value and the determination value of the template element of interest are output as a debug output and, then, the actual matching process is executed. With such a process with changed processing steps, it is possible to output the determination values in the sequence from the parent element toward offspring in the template.

The details of the changed procedure of matching will now be described. Here, the context number of interest is called a "watch point". In other words, the debug process is selectively executed for a watch point designated by the user (for example, the creator of the template) and a result is output.

1. When the current context is not a watch point, a normal matching process is applied.

2. When the current context is a watch point and WATCH_MODE=false, WATCH_MODE is changed to "true", a dummy matching process is applied, and the determination value is output as a debug output. The debug output may be displayed with suitable indents according to the depth of the node or in a tree structure, reflecting the hierarchical structure of the template. After the debug output is output, WATCH_MODE is set to "false" and a normal matching process is applied.

3. When the current context is a watch point and WATCH_MODE=true, a normal matching process is applied and the determination value is calculated.

In this procedure, the matching process is started while WATCH_MODE is set at "false". When the current context moves to a watch point, WATCH_MODE becomes true in the step 2 described above and a dummy matching process is applied. When the matching determination result of the lower level must be determined in order to determine the matching determination value of the watch point, such a case corresponds to step 1 or step 3 in the above-described procedure. Therefore, in such a case, a normal matching process is performed and a determination value is calculated. With these processes recursively repeated, the determination value of the watch point is determined in step 2 and is output as debug information 32 (refer to FIGS. 1 and 13).

In an exemplified case with the template (1) exemplified in the above-described section C and the directory record data of FIGS. 7 and 8, when the initial context which is the base point of the process is "4" and the watch point is designated at "6", the debug output may look like the following.

```
    Watch Point: :C6[SECTION] (below C4[CHAPTER])
    E2 http://server/template.html: Second line: [Assignable]
    Repetition: C6[SECTION]: Second text flowing in three repetitions
    | {{$SECTION.title$[[($SECTION.whatsNew$)]]:
    | *
    | + E3 http://server/template.html: Second line: [Assignable]
    Variable: value is [Function 1]
    | | {{$SECTION.title$[[($SECTION.whatsNew$)]]:
    | |   *
    | + E4 http://server/template.html: Second line: [Assignable]
    Selection range: Selected
    | | {{$SECTION.title$[[($SECTION.whatsNew$)]]:
    | |    *
    | | +E6 http://server/template.html: Second line: [Assignable]
    Variable: value is [Newly Arrived]
    | | | {{$SECTION.title$[[$SECTION.whatsNew$]]:
    | | |   *
```

Here, the symbols such as "E2" are node IDs of the template element. The symbol of "*" is a marker indicating the corresponding position in the debug output message of the template element in the previous line. "|" indicates template elements that are in a sibling relationship. In other words, the number of "|"s on the left of "+" indicates the depth of the template element on the parse tree.

Because there is no error in template (1), all of the debug result exemplified above is normal. When, on the other hand, the description of "$SECTION.whatNew$" in the template (1) is erroneously written as "$SECTION.whatsnew$", the debug output when the template process is applied under the same conditions as the above may look like the following.

```
    Watch Point: :C6[SECTION] (below C4[CHAPTER])
    E2 http://server/template.html: Second line: [Assignable]
    Repetition: C6[SECTION]: Second text flowing in three repetitions
    | {{$SECTION.title$[[($SECTION.whatsnew$)]]:
    | *
    | + E3 http://server/template.html: Second line: [Assignable]
    Variable: value is [Function 1]
    | | {{$SECTION.title$[[($SECTION.whatsnew$)]]:
    | |  *
    | +E4 http://server/template.html: Second line: [Non-Assignable]
    Selection range: not Selected
    | | {{$SECTION.title$[[($SECTION.whatsnew$)]]:
    | |    *
    |  |  +E6  http://server/template.html:  Second  line:
    [Non-Assignable] Variable: SECTION does not have value for
    designated attribute of whatsnew
    | | | {{$SECTION.title$[[$SECTION.whatsnew$]]:
    | | |   *
```

With such a configuration, it is possible to provide a debug function of the template. In other words, when the template processing result expected by the creator of the template cannot be obtained, it is possible to assist in finding the erroneous description of the conditions of the selection element of the template or data inconsistency in which the attribute value of the directory record data differs from that conceived in the template. It is also possible to configure the system so that every time the matching process of the template process reaches the watch point (that is, every time the step 2 described above is executed), the process awaits the input, the template process is blocked (temporarily stopped), and the process is released from the input wait block by a keyboard operation or a mouse operation to resume the template process (this corresponds to the step operation of the text flowing).

H. Encode Element

Next, an encode element which can be incorporated into the template will be described. For example, in a language that expresses a document such as XML and HTML, there are characters that cannot be used in a normal text string due to the specification of the language, and a special treatment such as a special modifier is needed in order to incorporate these characters in the text string. The encode element is used for instructing the replacement of the character according to the language in which the document is expressed.

The encode element starts with a text string of '#encode', followed by a text string <encode format> which designates the encode format. Then, <string of template elements> specifying the target to which the encode format is to be applied follows the encode format and the encode element ends with the text string of '#end'.

An example template including an encode element may look as follows (this template will hereinafter referred to as "template (5)").

```
    #encode XMLEntityEncoding
    #directory $*.ID$ == $JUMP.JUMPID$
    <A href="$SECTION.ID$.htm">
    $PART.title$:$CHAPTER.title$:$SECTION.title$</A>
    #end
    #end
```

Figure 21:
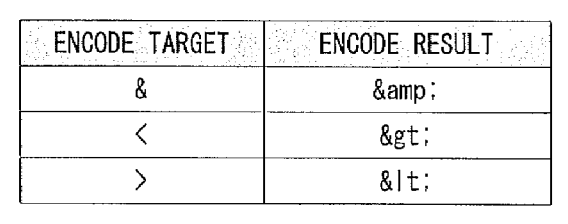

In this template (5), an encode format is designated on the first line and a target to which the encode format is to be applied is specified in the second through fourth lines. The encode rule of this form is a rule as shown in FIG. 21. For example, in this encode format, in order to incorporate a character of "&" in the text string, the character must be converted to "&".

A template including an encode element can be used by adding the following step 6 to the process of the matching section 28 (refer to (C2) described above).

6. When the node E of interest is an encode element, a determination value of the only child template element Ec is set as the determination value of the node E.

In addition, the following step 6 is added to the process of the text flowing section 34 (refer to (C3) described above).

6. When the node E of interest is an encode element, an encode method is set in a global variable (ENCODER) and, when the matching determination result of the only child template element Ec of the node E is <assignable> or <determined>, text flowing process is recursively applied designating the element Ec.

Moreover, step 2 of the text flowing process is changed as follows.

2. When the node E of interest is a variable element, v recorded in the matching process is encoded through the encode method designated in the global variable (ENDCODER) and output.

In the exemplified case of the template (5), the second through fourth lines describe the directory element shown in the template (4). Therefore, when the template (5) is applied to the directory record data of FIGS. 19 and 20 designating the context "13" as the initial context, a description is created, as a result of the process of the second through fourth lines, which is the text string (A) with the first line omitted (that is, the link description portion), and encoding is applied in the XMLEntityEncoding format. As a result, the following text string is output.

```
<A href="A0201010300.htm"> Basics: Operation&Procecure:
    Reference<3></A>
```

As described, with the use of the encode element, the text string of the template process result can be replaced with the correct encode format in the target language. For example, when the template process result is in the HTML format, it is possible to avoid a situation in which the document is not correctly displayed on a browser such as appearance of "<" in positions other than in a tag element.

The above-described encoding process is a process for converting a word in the attribute value "v" of the context that matches the variable element to another word. Alternatively, it is also possible to prepare multiple conversion tables and select a predetermined conversion table according to an environmental condition determined when the template process is executed (for example, a date and time or a parameter designated in a Web request) With such a configuration, more flexible encoding can be applied.

In the above description, an exemplified embodiment of the document processing system has been described. In the above-described document processing system, the hierarchical structure of the target document is merged to the hierarchical structure of the folders of the document database 10 to create integrated structure information, and the template is applied to the integrated structure information. According to this method, the same process can be applied throughout and without a discontinuity from the hierarchical structure of the folders to the hierarchical structure inside the document. In addition, by applying a template to the integrated structure information, it is possible to assign not only the information in a document, but also the information held by the hierarchical structure of folders which serves as an upper structure of the document (for example, the title of the folder) into the template to create an output document. Moreover, in this system, because the structure of the referenced document which is referred from the target document can be incorporated into the integrated structure information, an output document including the information of the referenced document can be created.

In the processing method of this system, execution of the process requires only information of the ancestor and offspring of the initial context and of the referenced document and ancestor of the referenced document. Therefore, by applying a control to load only these pieces of information from the document database 10 to a memory and to apply the process, the necessary amount of memory can be reduced.

Figure 22:
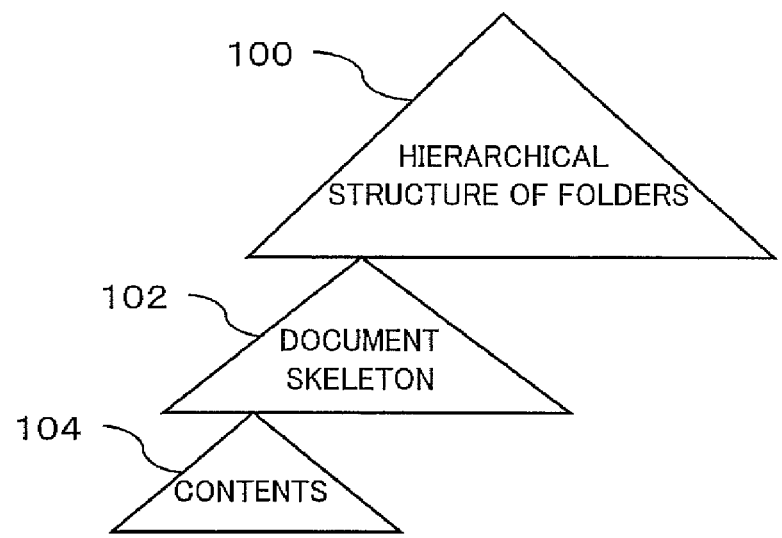
FIG. 22 is a diagram for explaining a document skeleton.

In the above-described exemplified case, the structure of the document is merged to the hierarchical structure of the folders. Alternatively, it is also possible to employ a three-stage structure as shown in FIG. 22. In the example structure of FIG. 22, a standard chapter structure such as part-chapter-section among the structures of the document is extracted and is set as a document skeleton 102. The root of the document skeleton 102 is merged to the node of the document in the hierarchical structure 100. For each node such as each chapter and each section in the document skeleton 102, the structure of the contents 104 of each chapter, section, etc., is merged. For example, the contents 104 of the chapter is a structure in which nodes, which are related to the standard chaptering structure such as section, and the offspring of these nodes are removed from the offspring of the chapter in the original document. The root of the tree structure of the contents 104 is merged to the corresponding node of the document skeleton 102. The extraction of the document skeleton 102 can be performed by the document acquisition section 12 and the reference acquisition section 16.

In the exemplified embodiment, the template is parsed to determine a parse tree, and the pattern matching of the parse tree and the tree of the integrated structure information to which the template is to be applied is used for specifying a portion to which the template can be applied.

Figure 23:
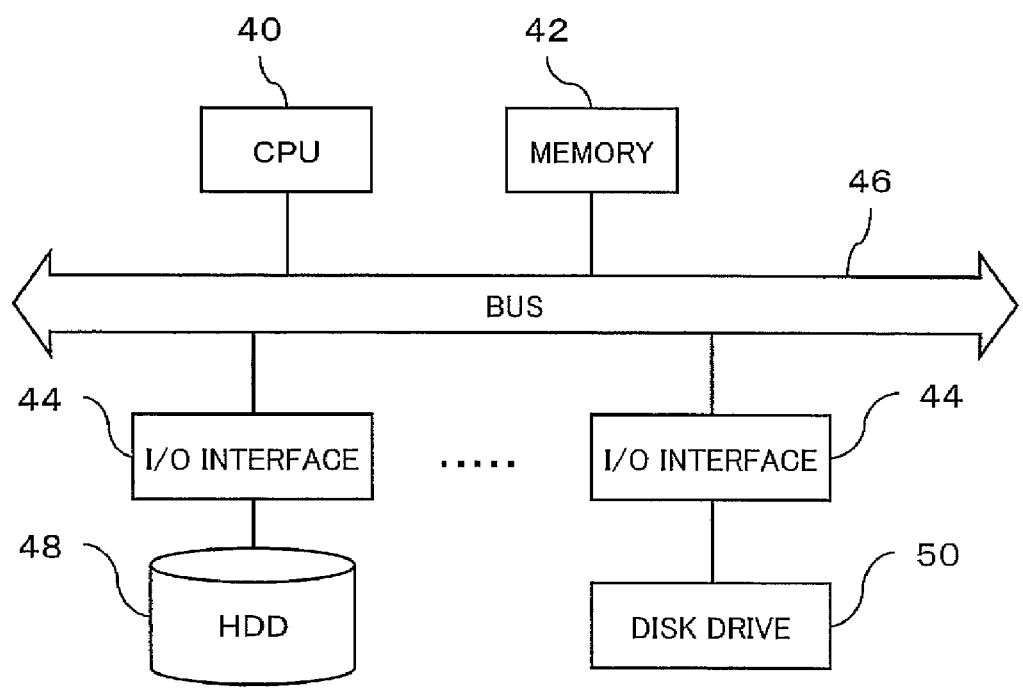
FIG. 23 is a diagram exemplifying a hardware structure of a computer system in which the document processing system is executed.

The document processing system is realized typically by executing a program describing the function or processing content of each constituting element described above on a general-purpose computer system. The computer system has, as hardware, a circuit structure in which a CPU (Central Processor Unit) 40, a memory (primary storage) 42, various I/O (input/output) interfaces 44, etc. are connected via a bus 46, as shown in FIG. 23. In addition, a hard disk drive 48 or a disk drive 50 for reading a transportable nonvolatile recording medium of any of various standards such as, for example, a CD, a DVD, and a flash memory, is connected, for example, to the bus 46 via the I/O interface 44. The drive 48 or 50 functions as an external storage device for the memory. A program describing the process of the exemplified embodiment is stored in the fixed storage device such as the hard disk drive 48 via a storage medium such as CD and DVD or via a network, and is installed into the computer system. When the program stored in the fixed storage device is read into the memory and is executed by the CPU, the process of the exemplified embodiment is realized.

Although a preferred form of the present invention has been described in its form with a certain degree of particularity using specific examples, it is to be understood that the invention is not limited thereto. It is to be further understood by those skilled in the art that various changes and modifications may be made in the invention without departing from the spirit and scope thereof.

What is claimed is:

1. A document processing method executed by a system established on one or more computers, the method comprising:

acquiring a first structured document, including a plurality of document elements forming a structure, from a folder among a group of folders, the group of folders having a hierarchical structure in a document database;

acquiring information of the hierarchical structure of the folders in the document database;

creating integrated structure information by merging the structure of the document elements of the first structured document into a position of a folder, in the hierarchical structure formed by the folders, in which the first structured document is stored;

adding a uniform resource locator attribute, created on the basis of an identification attribute of each folder or each document element in the integrated structure information, to the folder or the document element; and applying a template to the integrated structure information wherein in the process of applying the template to the integrated structure information, the uniform resource locator attribute added to each folder or document element is assigned to a corresponding variable in the template, and as a file name, the uniform resource locator attribute is attached to a file obtained by applying the template to the folder or the document element in the integrated structure information;

wherein in the process of applying the template to the integrated structure information, a parse tree is determined by parsing a structure formed by elements of the template, a folder or a document element in the integrated structure information that matches the element in the template is determined through a matching process of the structure around the current element in the integrated structure information and the parse tree, and information of the matching folder or the matching document element in the integrated structure information is supplied to each element of the template, the template includes a string of one or more template elements and each template element of the string is an element of one of the types of a group including a text element, a variable element, a repetition element, and a selection element.

2. The document processing method according to claim 1, wherein in the process of creating the integrated structure information, a structure formed by document elements of a second structured document referred to by a document element of the first structured document is merged to a position of a folder, in the integrated structure information, in which the second structured document is stored.

3. The document processing method according to claim 1, wherein in the process of creating the integrated structure information, a structure which conforms with a chaptering rule is extracted from among the structures of the first structured document as a document skeleton, and an individual structure which is not included in the document skeleton is expressed as an offspring of a document element corresponding to a root of the individual structure in the document skeleton.

4. The document processing method according to claim 1, further comprising:
acquiring mapping information indicating a correspondence relationship between a type of a folder or a document element and a template to be applied to the type of folder or document element; wherein
in the process of applying the template to the integrated structure information, a template corresponding to the type of the folder or the document element indicated in the mapping information is applied to each folder or document element in the integrated structure information.

5. The document processing method according to claim 1, further comprising:
acquiring mapping information indicating a correspondence relationship between a type of a folder or a document element and a plurality of templates to be applied to the type of folder or document element; and
adding, as an access information attribute and for each template in the mapping information to be applied to each folder or each document element in the integrated structure information, access information created on the basis of the identification attribute of the folder or the document element and information for specifying the template to each folder or document element, wherein
in the process of applying the template to the integrated structure information, each template corresponding to the type of the folder or the document element indicated in the mapping information is applied to each folder or each document element in the integrated structure information and data obtained by applying the template to the folder or the document element in the integrated structure information are stored in a manner to allow access through the access information.

6. The document processing method according to claim 1, further comprising:
adding, as an access information attribute, access information created based on the identification attribute of a folder or a document element in the integrated structure information and information for specifying a template, for each template when application of a plurality of templates are instructed for the folder or the document element,
wherein in the process of applying the template to the integrated structure information, each template is applied to the folder or the document element in the integrated structure information and data obtained by applying the templates to the folder or the document element in the integrated structure information are stored to allow access through the access information.

7. The document processing method according to claim 1, further comprising:
acquiring mapping information indicating a correspondence relationship between a type of a folder or a document element and a plurality of templates to be applied to the type of the folder or the document element; and
adding, to each folder or document element in the integrated structure information, as an access information attribute, and for each template in the mapping information to be applied to the folder or the document element, access information created on the basis of the identification attribute of the folder or the document element and information for specifying the template, and adding, as an access information attribute and for each folder or each document element for which no template to be applied is indicated in the mapping information, access information created on the basis of the identification attribute of the folder or the document element and access information of an ancestor folder or an ancestor document element, of the folder or the document element in the integrated structure information, for which the template to be applied is indicated in the mapping information,
wherein in the process of applying the template to the integrated structure information, each template corresponding to the folder or the document element indicated in the mapping information is applied to each folder or each document element in the integrated structure information, and data obtained by applying the template to the folder or the document element in the integrated structure information is stored in a manner to allow access through the access information.

8. The document processing method according to claim 1, further comprising:
acquiring mapping information indicating a correspondence relationship between a type of a folder or a document element and a template to be applied to the type of the folder or the document element; wherein
in the process of applying the template to the integrated structure information, a folder or a document element which corresponds to the type to which the template is to be applied is selected from among the folders or document elements in the integrated structure information, the selected folder or document element is set as a current element, and the template is applied with the current element as a base point.

9. The document processing method according to claim 8, wherein a directory element can be incorporated into the template, and in the process of applying the template to the integrated structure information, when a directory element in the template is detected, a folder or a document element, among the folders and document elements of the integrated structure information is set as a current element and the template in the directory element is applied.

10. The document processing method according to claim 1, wherein an encode element can be incorporated into the template, and in the process of applying the template to the integrated structure information, an encoding process indicated by an encode element is applied to a text string to which the template in the encode element is applied.

11. A storage medium readable by a computer, the storage medium storing a program of instructions executable by the computer to perform a function for template processing, the function comprising:

acquiring a first structured document including a plurality of document elements forming a structure;

acquiring information of a hierarchical structure of folders in a document database;

creating integrated structure information by merging the structure of the document elements of the first structured document into a position of a folder, in the hierarchical structure formed by the folders, in which the first structured document is stored;

adding a uniform resource locator attribute, created on the basis of an identification attribute of each folder or each document element in the integrated structure information, to the folder or the document element; and applying a template to the integrated structure information wherein in the process of applying the template to the integrated structure information, the uniform resource locator attribute added to each folder or document element is assigned to a corresponding variable in the template, and as a file name, the uniform resource locator attribute is attached to a file obtained by applying the template to the folder or the document element in the integrated structure information;

wherein in the process of applying the template to the integrated structure information, a parse tree is determined by parsing a structure formed by elements of the template, a folder or a document element in the integrated structure information that matches the element in the template is determined through a matching process of the structure around the current element in the integrated structure information and the parse tree, and information of the matching folder or the matching document element in the integrated structure information is supplied to each element of the template, the template includes a string of one or more template elements and each template element of the string is an element of one of the types of a group including a text element, a variable element, a repetition element, and a selection element.

12. A document processing system, established on one or more computers, for creating a document by applying one or more templates to a plurality of structured documents stored in a folder in a group of folders having a hierarchical structure in a document database, the system comprising:

a document acquisition section that acquires a first structured document, the first structured document including a plurality of document elements forming a structure;

a folder structure acquisition section that acquires information of a hierarchical structure of the folders in the document database;

an integrated structure information creating section that creates integrated structure information by merging the structure of the document elements of the first structured document into a position of a folder, in the hierarchical structure formed by the folders, in which the first structured document is stored;

a uniform resource locator attribute section that adds a uniform resource locator attribute, created on the basis of an identification attribute of each folder or each document element in the integrated structure information, to the folder or the document element; and a template processing section that applies a template to the integrated structure information, the uniform resource locator attribute added to each folder or document element being assigned to a corresponding variable in the template, and as a file name, the uniform resource locator attribute being attached to a file obtained by applying the template to the folder or the document element in the integrated structure information;

wherein in the process of applying the template to the integrated structure information, said template processing section determines a parse tree by parsing a structure formed by elements of the template, said template processing section determines a folder or a document element in the integrated structure information that matches the element in the template through a matching process of the structure around the current element in the integrated structure information and the parse tree, and said template processing section supplies information of the matching folder or the matching document element in the integrated structure information to each element of the template, the template includes a string of one or more template elements and each template element of the string is an element of one of the types of a group including a text element, a variable element, a repetition element, and a selection element.

* * * * *